Feb. 21, 1928.
F. E. WOODFORD
1,659,904
MEANS FOR REGULATING TRAFFIC
Filed Sept. 14, 1922
12 Sheets-Sheet 1
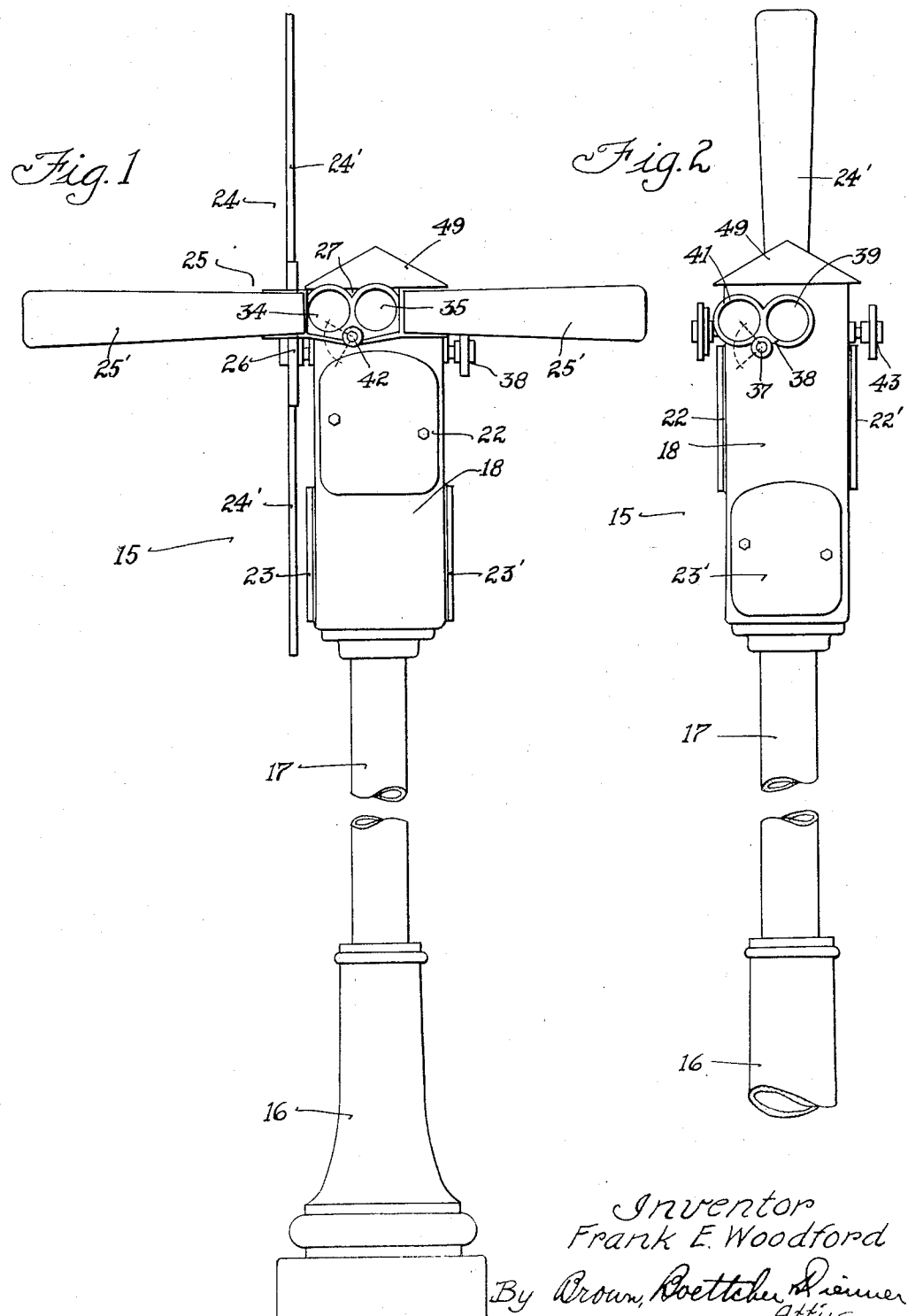

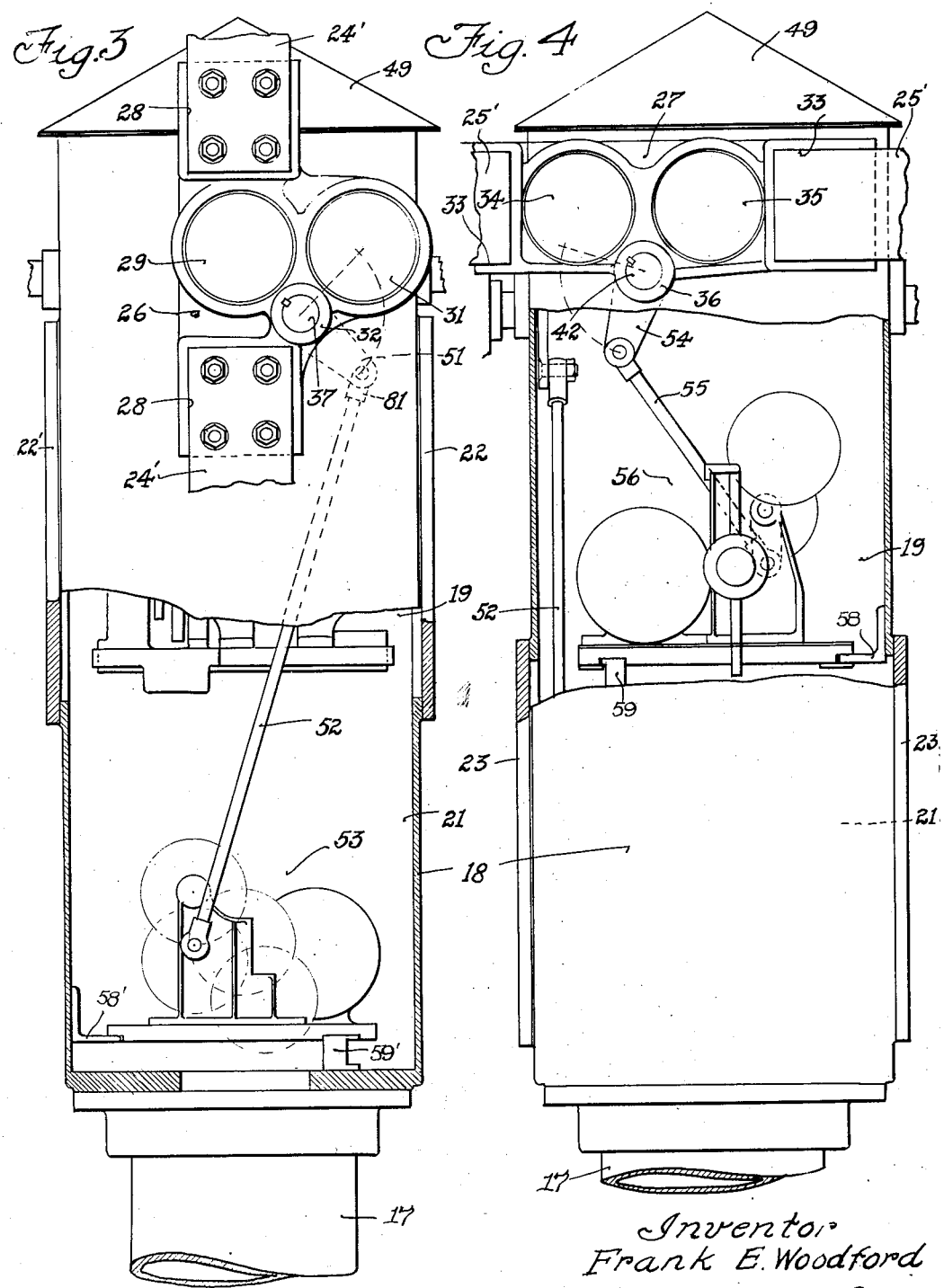

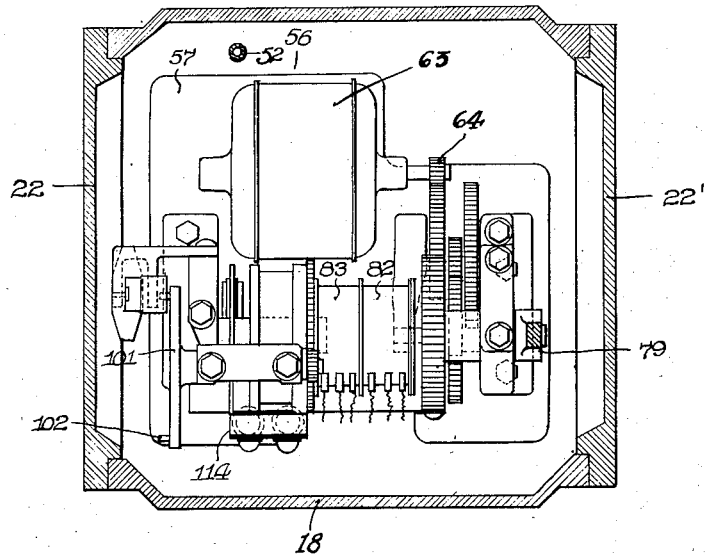
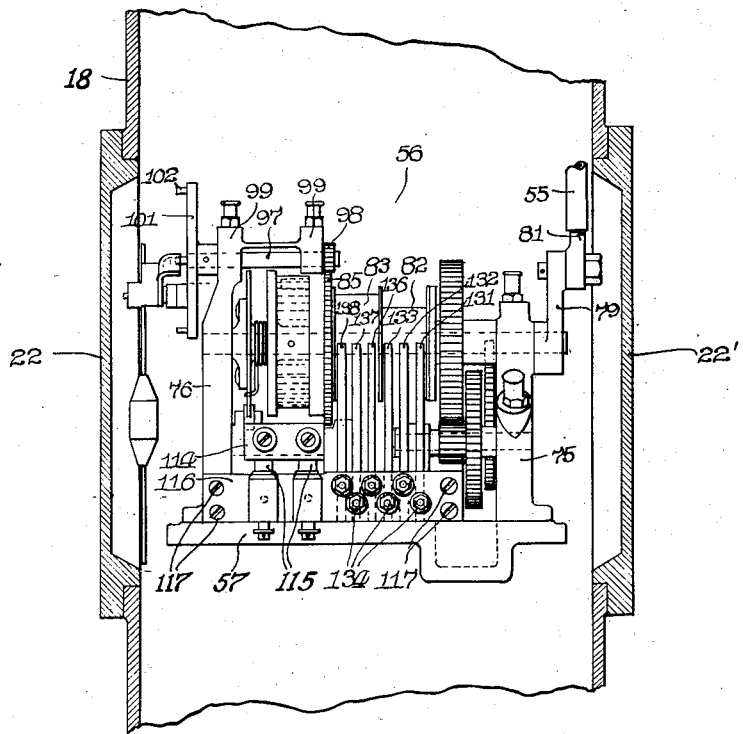

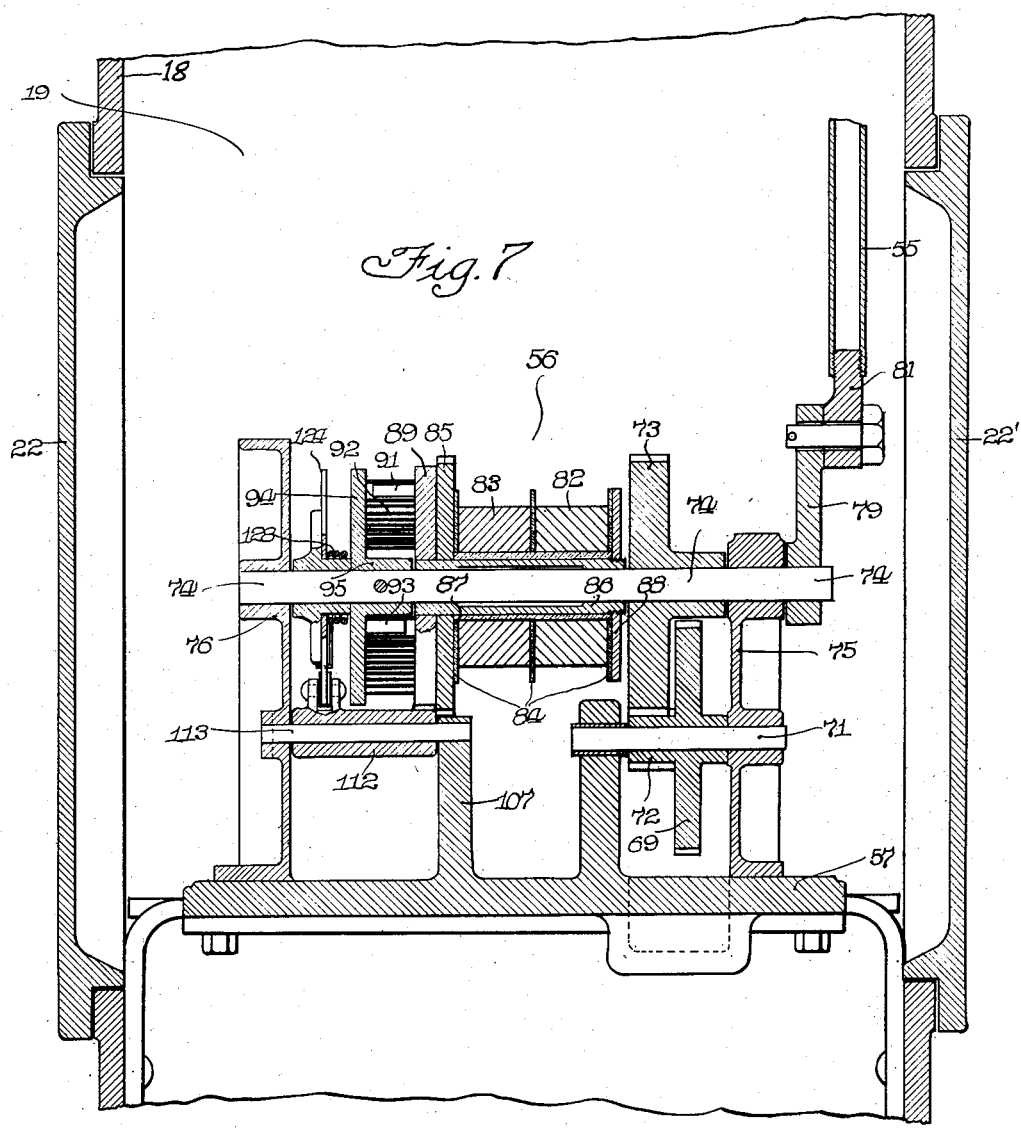

Feb. 21, 1928.
F. E. WOODFORD
1,659,904
MEANS FOR REGULATING TRAFFIC
Filed Sept. 14, 1922     12 Sheets-Sheet 5
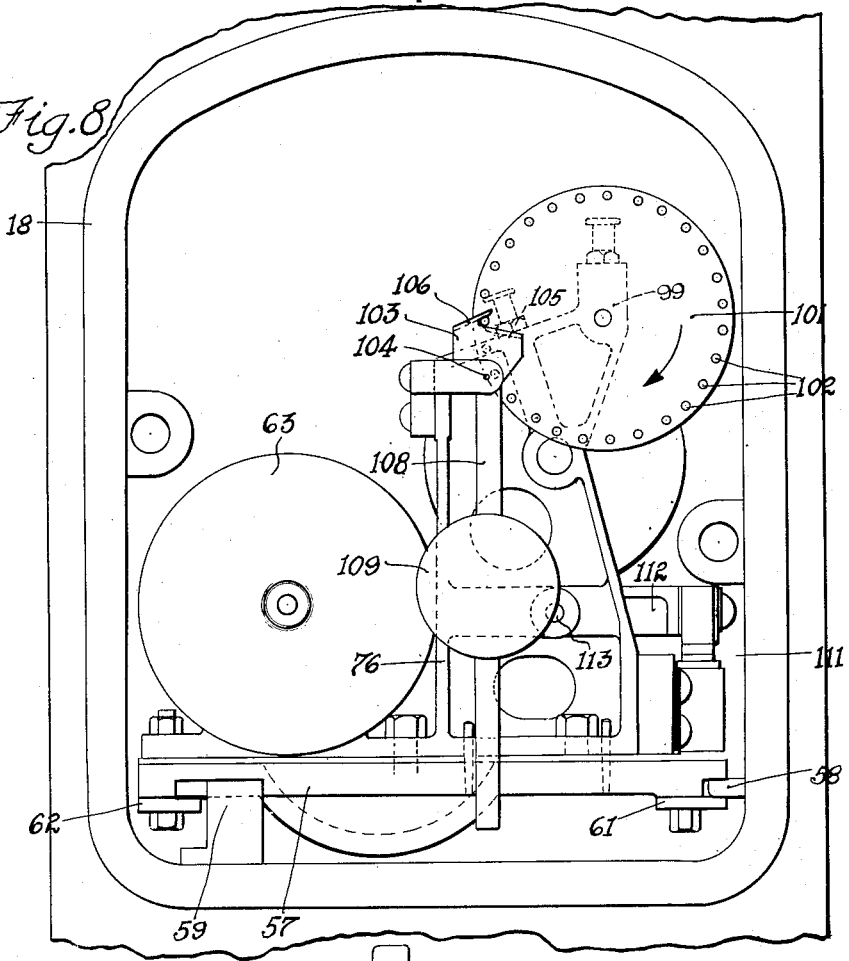
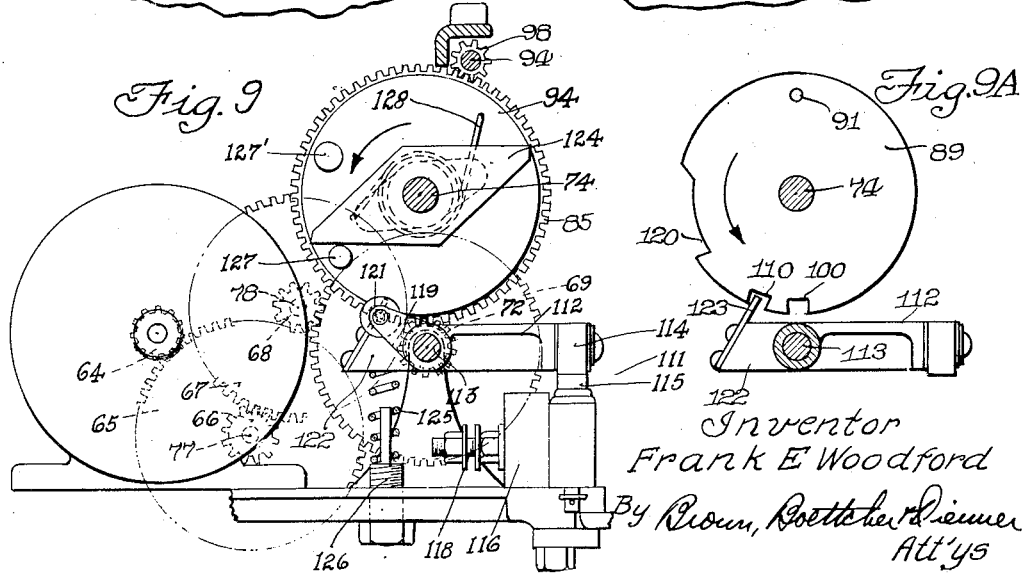
Inventor
Frank E Woodford
By Brown, Boettcher & Diemer
Att'ys Feb. 21, 1928.
F. E. WOODFORD
1,659,904
MEANS FOR REGULATING TRAFFIC
Filed Sept. 14, 1922    12 Sheets-Sheet 6
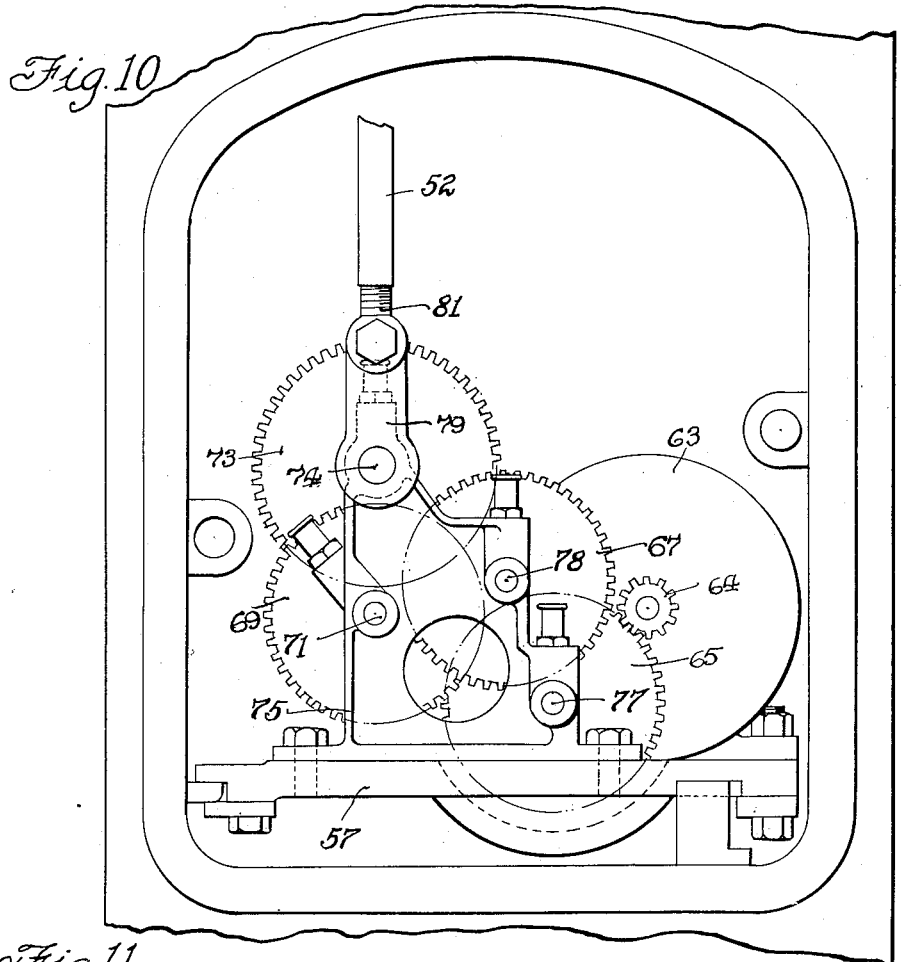
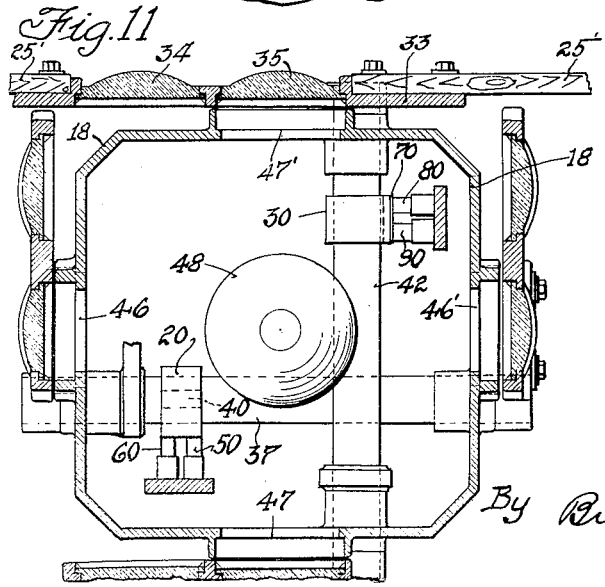
Inventor
Frank E. Woodford
By Brown, Boettcher & Diemer
Att'ys

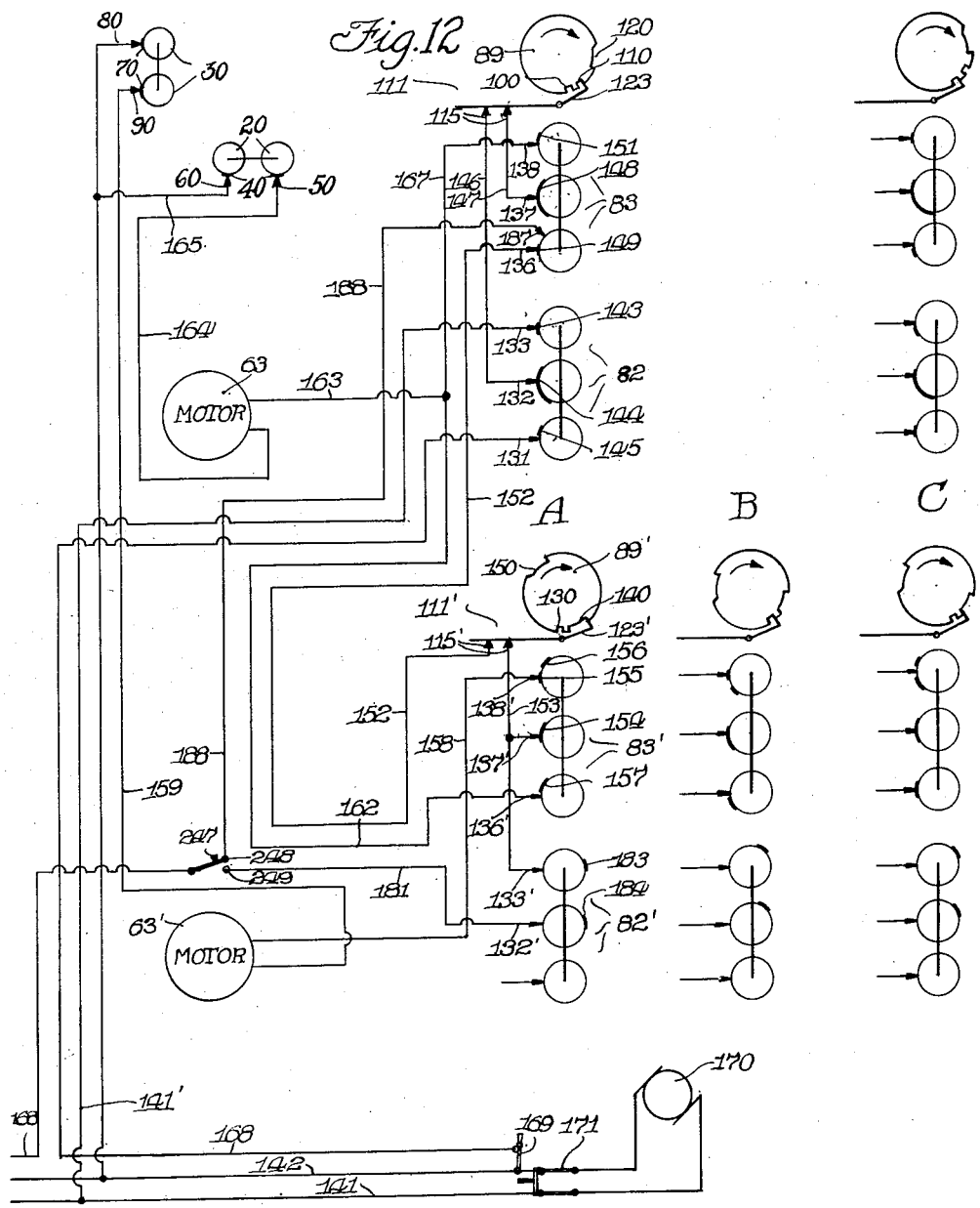

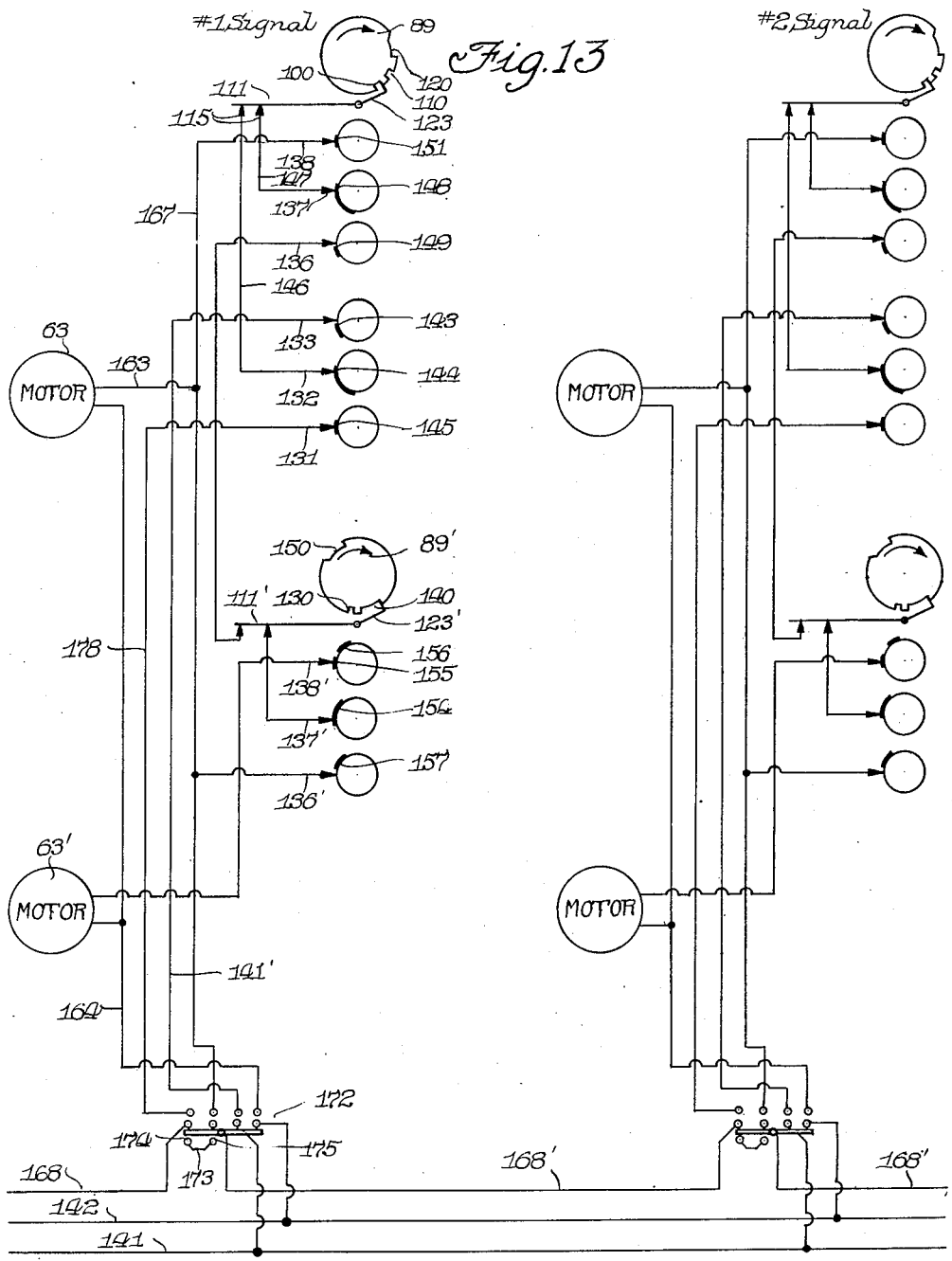

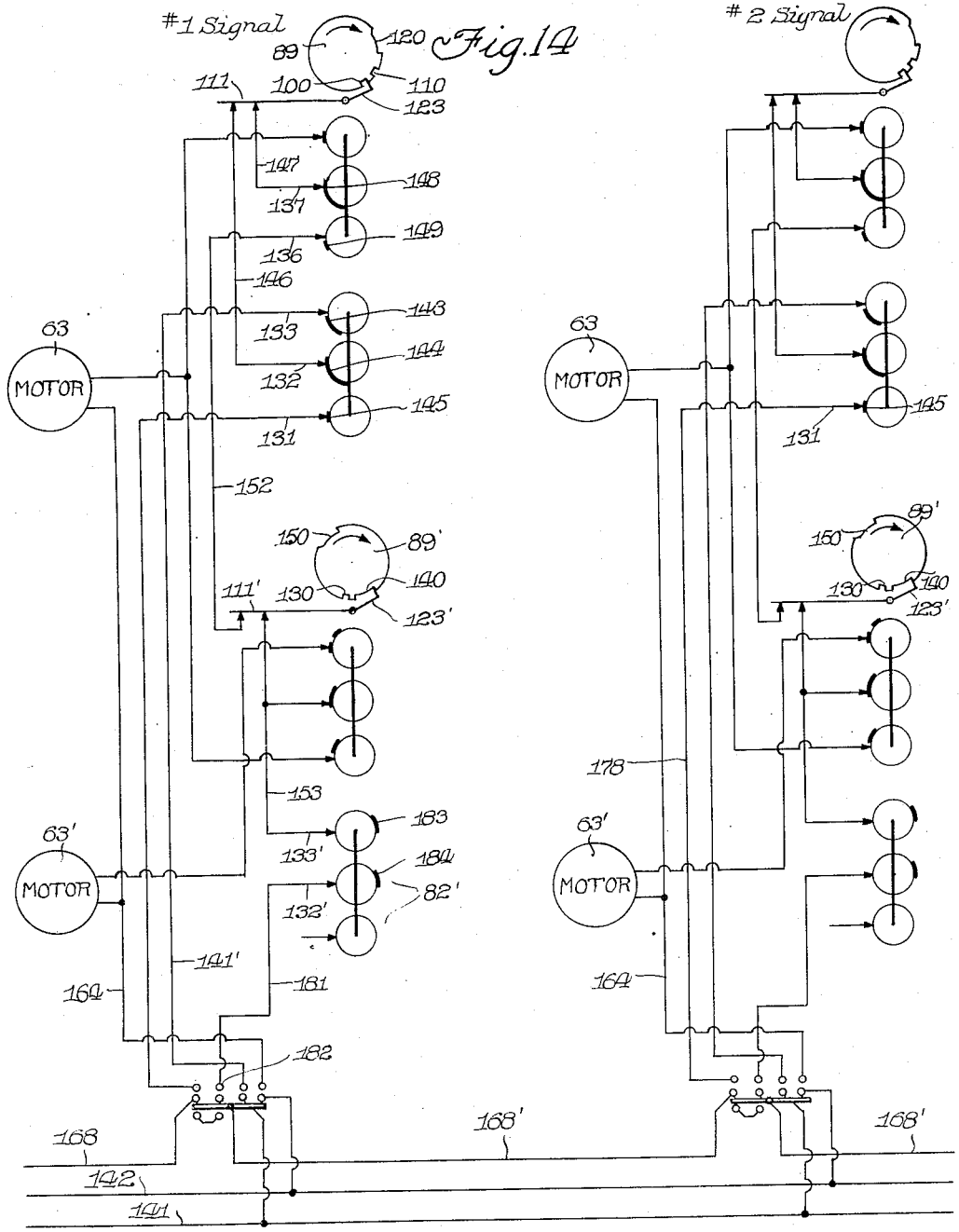

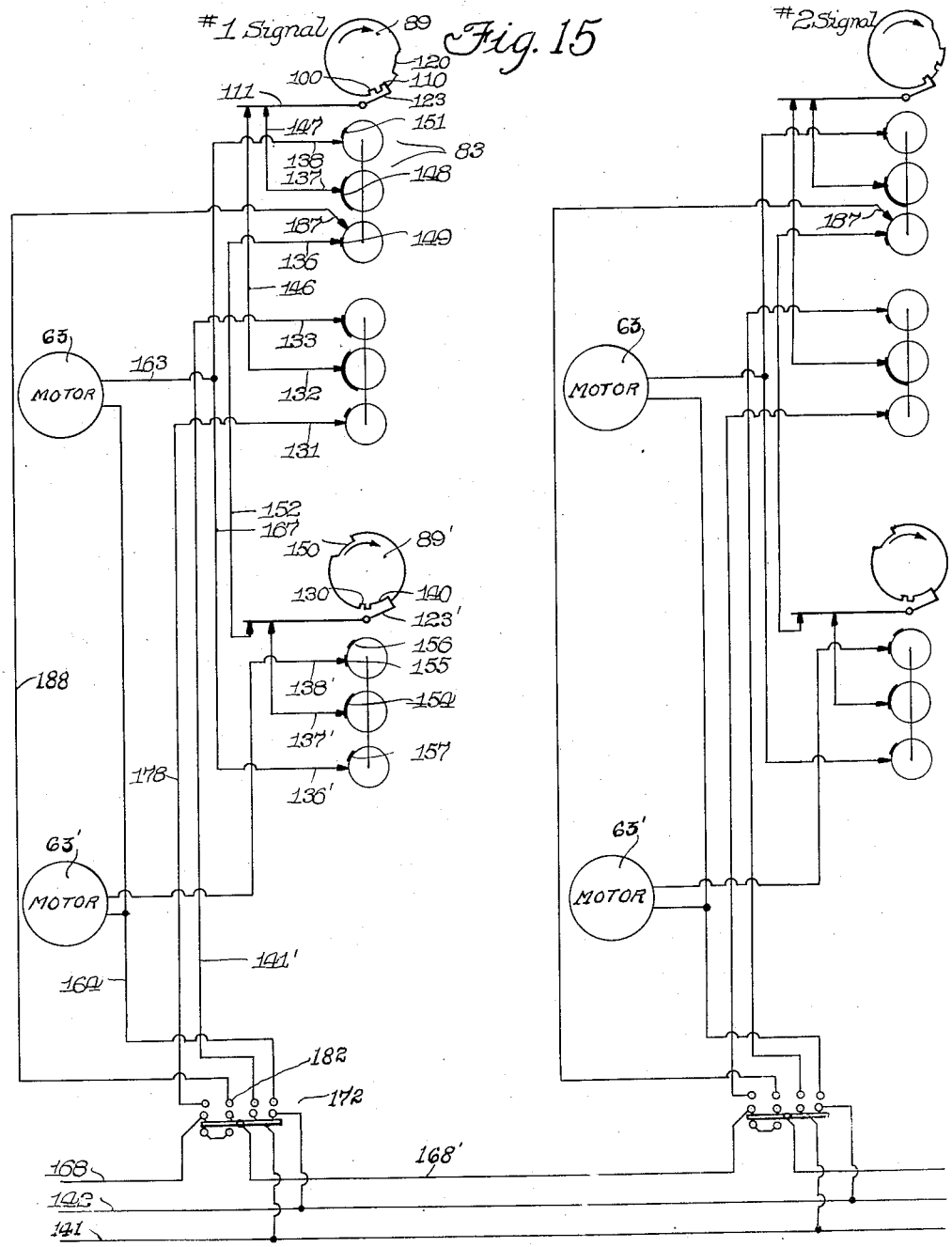

Feb. 21, 1928.
F. E. WOODFORD
1,659,904
MEANS FOR REGULATING TRAFFIC
Filed Sept. 14, 1922  12 Sheets-Sheet 11
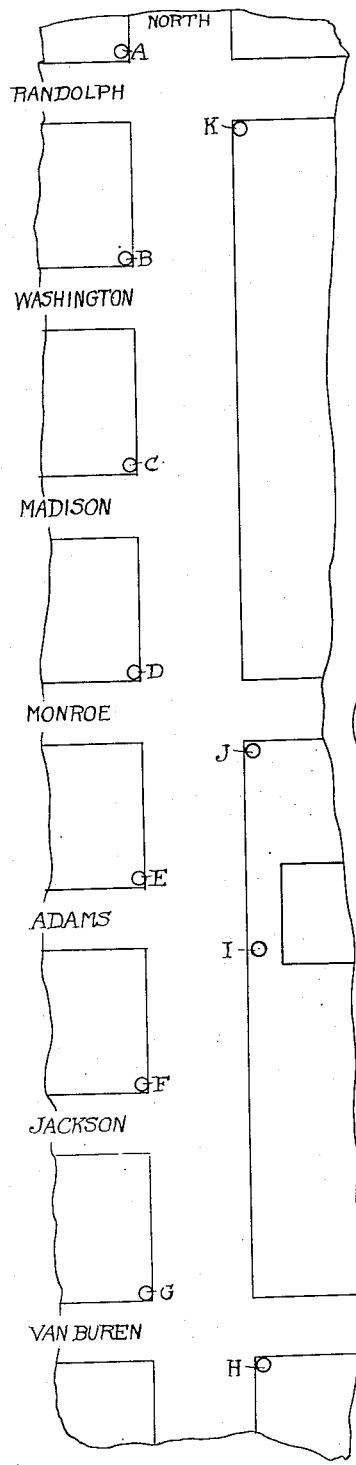
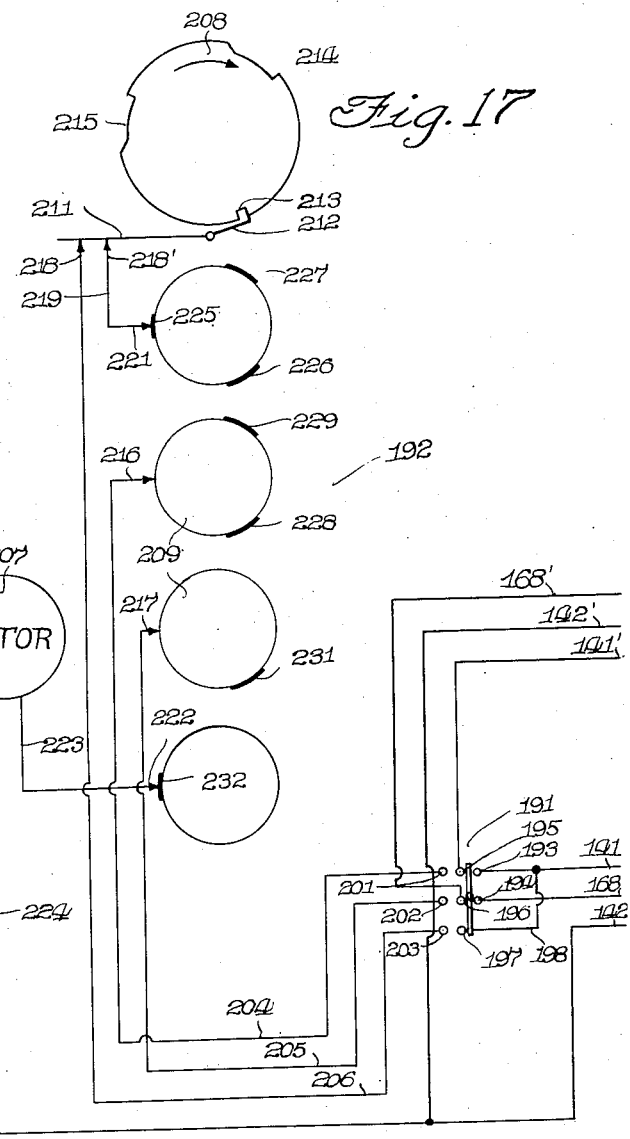
Inventor
Frank E Woodford
By Brown, Boettcher & Diemer
Att'ys Feb. 21, 1928.
F. E. WOODFORD
1,659,904
MEANS FOR REGULATING TRAFFIC
Filed Sept. 14, 1922　　12 Sheets-Sheet 12
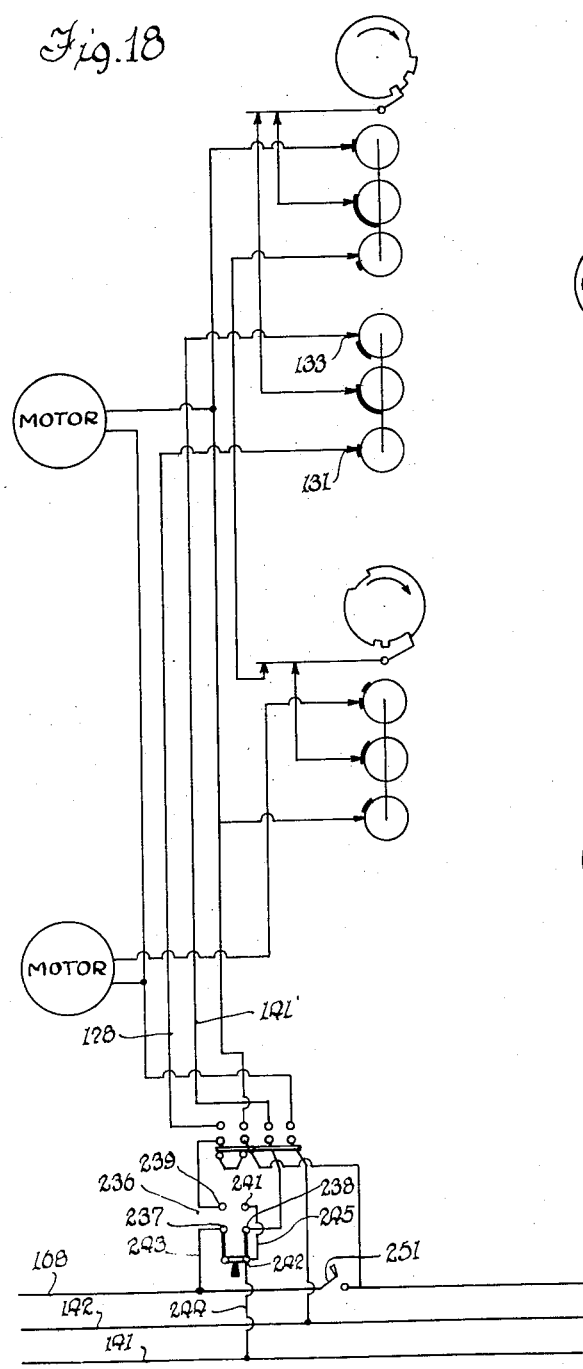
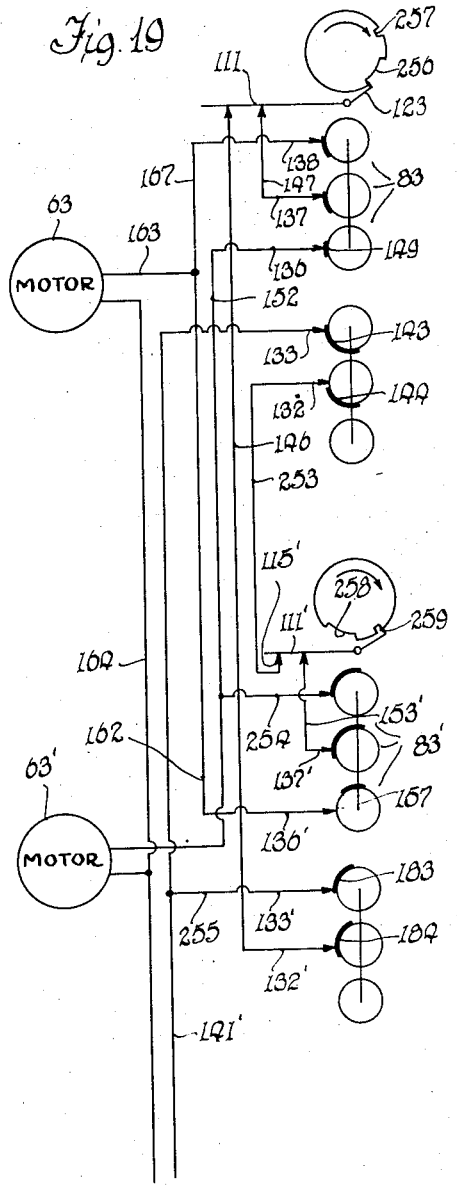
Inventor
Frank E. Woodford
By Brown, Boettcher & Wiemer
Att'ys Patented Feb. 21, 1928.

1,659,904

UNITED STATES PATENT OFFICE.

FRANK E. WOODFORD, OF CHICAGO, ILLINOIS.

MEANS FOR REGULATING TRAFFIC.

Application filed September 14, 1922. Serial No. 588,117.

The present invention relates to a method of and means for regulating traffic, particularly vehicle traffic, at busy intersections in large cities and along congested traffic arteries and thoroughfares.

With respect to the means for regulating traffic, the invention is concerned with improved apparatus in the nature of semaphores or other signalling mechanism adapted for location at street intersections or along traffic arteries and arranged for automatic operation on a time schedule or in accordance with a predetermined sequence of operation of a plurality of such signalling mechanisms.

With respect to the method of regulating traffic, the invention is particularly concerned with different methods of operating the successive signalling mechanisms whereby the cross and through traffic may be readily controlled at a given intersection or intersections, or, whereby a thoroughfare may be opened up to traffic either in progressive sequence, in retrogressive sequence, or by a simultaneous actuation of the signalling mechanisms.

The most difficult problems in traffic regulation arise at the intersection of a cross street with a boulevard or similar main traffic artery. Signalling apparatus which is capable of handling traffic at these intersections is generally capable of handling traffic in most other situations. In the subsequent description I shall have frequent occasion to differentiate the operations of the two semaphore arms on each signalling unit and to illustrate the wide range of selection and control I shall consider the functions of the mechanism with reference to conditions arising at such an intersection; it being understood that there is no limitation of the mechanism to these situations but that it is capable of use at the intersection of ordinary cross streets or along a thoroughfare without regard to intersections.

One of the objects of the invention is to provide a signalling unit in which the semaphore arm which controls the boulevard traffic and the semaphore arm which controls the cross-street traffic are mechanically independent of each other, each being operated by its own motor drive and its own timing element.

A further object is to provide improved timing mechanism for each arm which is adjustable to give a wide range of time control to either arm independently of the other.

A further object is to so relate the operation of the arms that the boulevard arm must move to a closed position before the cross-street arm can move to an open position, and preferably vice versa. This mode of operation enables automobiles to approach the signal with safety at a much higher rate of speed, such mode of operation being desirable for the outlying districts. It is also within the range of my invention to have the two arms operate in unison whereby the arm for one direction of traffic is moving to its closed position while the other arm is moving to its open position, and vice versa. Such arrangement may be employed in congested districts where the traffic is moving slowly.

It is a further object to provide means for interlocking the two arms together so as to render it impossible to have both arms in open position at the same time; and also to prevent one arm from moving to an open position until the other arm has substantially completed its movement into the closed position.

The signal preferably displays a green light when the corresponding arm is vertical or "open", and a red light when the arm is horizontal or "closed", the position of the arm and the color of the light being plainly visible in opposite directions.

A further object is to provide a system of interconnecting automatic control circuits whereby the boulevard arms or the cross-street arms of numerous signals, as at different intersections, all operate in unison.

A further object is to provide a system of interconnecting control circuits so interlocked between successive signals as to be capable of opening or closing the boulevard successively at different points according to a predetermined sequence of operation and with predetermined time intervals intervening between successive signals. These predetermined time intervals between signals may be proportioned to accommodate the desired speed of automobile driving. The above mode of operation will allow automobiles to be driven upon the boulevard without the hindrance and delay of successive signals closing against them, and still without reducing the time interval available for cross traffic. As illustrative of one adaptation for certain conditions, the control system may be arranged to secure a progressive or consecutive sequence of operation of the signals with respect to the direction of the traffic or the major portion thereof. That is to say the signals may be arranged to open successively down along the boulevard in the direction of the traffic flow. As illustrative of another adaptation for other conditions the sequence of operation may be retrogressive, i. e., the signals may be arranged to open successively back against or counter to the direction of the greatest traffic flow. This latter arrangement may be desirable where there is a heavy cross-street traffic turning into the boulevard and running out along the boulevard in one direction.

A further object of the invention is to provide an automatic control system whereby a switch upon any one of the signals in the system or at any desired control point provides a means of stopping the operation of all of the signals with the boulevard arms open, and preferably with the cross-street arms closed. This arrangement permits the signals to be turned off during certain hours of the day or night, or provides for the accommodation of parades and the like.

A further object is to provide a control system which may be operated automatically during the entire twenty-four hours of the day or a lesser period, or which may be operated manually during rush periods by push buttons or switches located at any desired point and then thrown into automatic operation during non-rush periods.

A further object is to provide a control system by which all of the signals in the system, or in a certain part thereof, may be operated automatically upon any desired time interval or intervals during the day, and by the operation of a switch may be thrown into a different time interval of any desired length during the non-rush hours.

Other objects pertinent to new and improved features of construction and operation will be set out in the following description of an exemplary embodiment of the invention. In the drawings accompanying this description:

Fig. 1 is an elevational view of one of the signal units;

Fig. 2 is a similar view looking at right angles to Fig. 1 and from the right side thereof;

Fig. 3 is an enlarged view of the signal housing, the lower part thereof being broken away to illustrate the arrangement of the lower motor unit;

Fig. 4 is a similar view taken at right angles to Fig. 3 and from the right side thereof, the upper part of the housing being broken away in this instance to show the arrangement of the upper motor unit;

Fig. 5 is a plan view of one of the motor units in position in the signal housing;

Fig. 6 is a side elevational view of the same;

Fig. 7 is a longitudinal sectional view through one of the motor units;

Fig. 8 is an end elevational view of one of the motor units in position in the signal housing;

Fig. 9 is a fragmentary detail section of one of the motor units, which we shall assume to be the upper one;

Fig. 9^A is a fragmentary sectional view of parts not clearly shown in Fig. 9;

Fig. 10 is a view similar to Fig. 8 of the other end of the motor unit;

Fig. 11 is a horizontal sectional view through the upper part of the signal housing;

Fig. 12 is a wiring diagram of one of the signal units, showing the different positions of the contact drums and their associated locking discs;

Fig. 13 is a wiring diagram showing the interconnecting control circuits between two or more signals when arranged for operation in unison or simultaneously;

Fig. 14 is a similar view showing the circuit connections between a plurality of signals when arranged for progressive operation;

Fig. 15 is a similar view showing the circuit connections employed when arranged for retrogressive operation;

Fig. 16 is a schematic layout of a boulevard and intersecting cross streets for the purpose of illustrating the applicabilities of each of the above theories of operation;

Fig. 17 is a diagrammatic circuit representation of an auxiliary or master timing mechanism;

Fig. 18 shows the circuit connections employed for manual control, and

Fig. 19 illustrates the circuit connections for simultaneous actuation of both semaphore arms.

Referring to Figures 1 and 2, each semaphore unit 15 is erected at a conspicuous point at the street intersection or along the thoroughfare on a suitable pedestal 16 from which rises a supporting column 17. A comparatively long rectangular housing 18 is suitably mounted on the upper end of the column 17. The lower part of this housing is sub-divided into upper and lower compartments 19 and 21 (Figs. 3 and 4), access to which is afforded through opposing pairs of removable doors 22—22′ and 23—23′ respectively. These compartments house the motor units which operate the semaphore arms, as I shall presently describe.

Pivotally mounted in the upper part of the housing 18 are the two semaphore arms 24 and 25 facing at right angles to each other. It will be noted that the semaphore arm 25 is pivoted on a slightly higher axis than the arm 24. This higher arm 25, which, for clarity of description I shall hereinafter consider as the "boulevard arm", consists of two oppositely extending arms 25' mounted in a central hub 27. The lower semaphore arm 24, hereinafter referred to as the "cross-street arm," likewise consists of two oppositely extending arms 24' mounted in a central hub 26. As shown in Figure 3 the hub 26 is constructed as a generally T-shaped casting having sockets 28 in which are bolted or riveted the ends of the semaphore arms 24'. Intermediate these sockets the casting is formed with two apertures for receiving the green and red bull's-eyes or lenses 29 and 31. The hub proper about which the semaphore arm and the glasses 29 and 31 revolve is designated 32 and is located on a median line between the glasses. The hub 27 for the other semaphore arm is likewise formed with sockets 33 in which are suitably secured the semaphore arms 24'—24'. Intermediate these sockets the casting is formed with two large apertures for receiving the green and red glasses 34 and 35; in this instance, however, the two glasses being disposed in longitudinal alignment with the semaphore arms, instead of in transverse alignment, as in the hub 26. The hub proper is designated 36 and is also positioned on a median line between the lenses 34 and 35 and to one side thereof.

The semaphore hub 32 is keyed to one end of an operating shaft 37 which extends transversely through the housing 18, having bearing support in the side walls thereof, and having its other end projecting from the other side of the housing for mounting a glass supporting frame 38 (Fig. 2). This frame holds green and red glasses 39 and 41 which are disposed in alignment parallel to the corresponding glasses 29 and 31 on the opposite side of the housing. The other semaphore arm 25 is revolved about a shaft 42 which is keyed at one end to the hub 36 and has bearing support in the side walls of the housing, similarly to the shaft 37. The shaft 42 is disposed at right angles to the shaft 37 and passes through the housing above the level of the shaft 37. The opposite extending end of the shaft mounts a frame 43 holding red and green glasses or bull's-eyes in corresponding relation to the bull's-eyes 34 and 35 in the semaphore hub. Referring to Figure 11, it will be observed that the pair of red and green bull's-eyes in each frame or hub is adapted to move into and out of register with a window in its corresponding side of the housing 18. The four windows in the four side walls of the housing are indicated at 46—46' and 47—47'. These windows are all in substantially the same plane and receive illumination from a common source of light represented by the electric light bulb 48, which is positioned in the center of the housing in the same plane as the windows. The bulb 48 is supported in a socket which may be mounted in any suitable manner in a tapering cap 49 covering the top of the housing 18. The operation of the shafts 37 and 42 is so related that when the green bull's-eyes are in register with the windows 46—46' for giving a "go-ahead" indication along the cross-street, the red bull's-eyes will be in register with the opposite pair of windows 47—47' for giving a "stop" indication along the bulevard. Obviously, the semaphore arms 25 and 24 assume the same "go-ahead" and "stop" positions.

Where traffic is moving fast it is preferable to actuate the semaphore arms successively rather than simultaneously. In this mode of operation, assuming the boulevard semaphore to be down, it will only be brought up to a "go ahead" position after the cross-street semaphore has been moved down completely to a "stop" position. Similarly, the cross-street semaphore will only be brought to a "go-ahead" position after the boulevard semaphore has been brought down to a full stop position. Thus there is minimum possibility of collisions and jams from fast moving traffic. Where the traffic is moving comparatively slow, however, it is practicable to actuate both semaphore arms simultaneously, i. e., when the boulevard arm is moving up the cross-street arm is moving down and vice versa. My present control systems provide for either mode of operation.

When the semaphore arms are arranged for successive actuation it is also desirable to provide interlocking means so as to insure that one arm is completely down in "stop" position before the other arm can move up into "go-ahead" position. This avoids any possibility of both arms accidentally arriving in "go-ahead" positions at the same time, which would be likely to cause accidents in congested or fast moving traffic. This interlocking mechanism is electrical in operation, and comprises a slip ring 20 of insulation mounted on the lower semaphore shaft 37 and a similar slip ring 30 mounted on the upper semaphore shaft 42. A conducting segment 40 is carried by the slip ring 20 and is so disposed as to make simultaneous contact with two adjacent brushes 50 and 60 when the semaphore arm is in its horizontal "stop" position. These brushes are included in the electrical circuit of the motor unit which drives the other semaphore arm—as I shall presently describe—and consequently this other semaphore cannot operate until the first semaphore arm is in horizontal position. A similar segment 70 on the other slip ring 30 is adapted to make simultaneous contact with two brushes 80 and 90 which are included in the circuit of the other motor unit for performing a similar interlocking function for the other arm. The semaphore shaft 37 is operated through the medium of a crank arm 51 which has pivotal connection through a connecting rod 52 with an individual motor unit 53 in the lower compartment 21 of the housing. The other semaphore shaft 42 is similarly operated through a crank arm 54 which has pivotal connection through a connecting rod 55 with an individual motor unit 56 in the upper compartment 19 of the housing. Each crank rotates its respective shaft through substantially 90 degrees in moving the semaphore between its two positions, and the positions of the cranks and their directions of throw are so arranged that the semaphore arms 24 and 25 will always move in opposite directions (viewed from the semaphore ends of the shafts) when moving into either their stop or go-ahead positions, so that there is no possibility of interference between the semaphore arms.

The motor units 53 and 56 are substantially identical in construction and operation and a description of one of these units will suffice for both. Referring to Figures 6, 7 and 9, it will be noted that the upper motor unit 56 is assembled upon a base plate 57 which is removable from the housing 18 so that the motor unit in its entirety can be removed and replaced for adjustment and repairs with minimum inconvenience. The base plate 57 is arranged for sliding into or out of the housing on a lateral guide flange 58 and a guide rail 59. A lower bar 61 is secured to the bottom of the base plate 57 to hook under the flange 58, and a similar bar 62 is secured to hook under the flange projecting from the rail 59. Access is afforded to either end of the motor units through the removable doors 22—22', these doors covering large openings in the opposite sides of the housing through either of which the motor units can be removed or replaced.

The prime mover for actuating the semaphore arms and for energizing the time escapement mechanism consists of an electric motor 63 which is bolted on to the base plate 57 in the position shown in Figures 5 and 9. The shaft of this motor carries a small pinion 64 which drives through a train of reduction gearing illustrated in Figure 9. Pinion 64 meshes with the large gear 65 which in turn is provided with a small pinion 66 meshing with a second large idler gear 67. This latter gear in turn carries a small pinion 68 which meshes with a large gear 69 on the stub shaft 71. The gear 69 carries a pinion 72 which meshes with a large driving gear 73 on the main actuating shaft 74. The shaft 74 is journaled at its end in two spaced bearing blocks 75 and 76 which are bolted to the base plate 57. The stub shaft 71 and the stub shafts 77 and 78 for the other idler gears are also mounted in the block or bearing pedestal 75. The shaft 74 extends beyond the pedestal bearing 75 and has pinned thereto a crank arm 79 which has pivotal connection with the lower end of the connecting rod 55. This is the connecting rod that extends up and operates the semaphore arm 25. The connecting rod 52 is preferably in the form of a sleeve having its ends internally threaded for reception over threaded pivot lugs 81, whereby the effective length of the connecting rod can be increased or decreased by merely rotating the sleeve 55. As shown in Figure 5, the connecting rod 52 passes up to the crank 51 in close proximity to the side of the housing so as to clear the upper motor unit 56.

Sleeved on the shaft 74 so as to be rotatable thereon are two juxtaposed contact drums 82 and 83 which are spaced from each other and from the adjacent gears by insulating washers 84. These two contact drums are connected together so as to be driven in unison by a large gear 85, which is advanced in accordance with the motion of the time escapement mechanism, as I shall presently describe. As shown in section in Figure 7, the contact drums 82 and 83 are assembled on a sleeve 86 which is freely rotatable on the shaft 74. An insulating sleeve 87 is interposed between the contact drums and the sleeve 86, and, as before described, the sides of the contact drums are insulated by the fibre washers 84. A flange 88 threads over the end of the sleeve 86 and rigidly clamps the contact drums in assembled relation on the sleeve 86.

Suitably secured to the outer side of the gear 85 is a disc 89 having a pin 91 projecting laterally therefrom for receiving the outer end of the spiral motive spring 92. The inner end of this spring is connected to a pin 93 which projects laterally from a disc 94 disposed on the other side of the spring, this disc having a central hub 95 which is pinned to the main actuating shaft 74. The energy which is stored up in this spring tends to rotate the disc 89 and thereby the contact drums 82 and 83 with a relatively rapid rotational motion, but this is retarded by a time escapement shaft 97 which carries a small pinion 98 meshing with the gear 85. The escapement shaft 97 is journaled in suitable bearings 99 carried by the end bearing plate 76, and projects beyond said plate to carry an escapement wheel 101. As shown in Figure 8, this wheel is provided with a plurality of laterally extending pins 102 spaced about its circumference and adapted for step by step advancement past the escapement member 103. This escapement is pivoted at 104 on the bearing plate 76 and it comprises two laterally bent flanges 105 and 106 extending in inclined relation from the upper edge of the member 103. The upper flange 106 overlies the end of the lower flange 105 and the two flanges are separated by a narrow clearance area sufficient in width to permit the passage of each of the pins 102 between the flanges. The escapement member 103 is provided with a depending arm 108 for supporting an adjustable pendulum bob 109, any suitable set screw of the like providing for adjustment. A similar arm may extend upwardly above the pivot 104, for supporting a second pendulum bob, as for the purpose of giving greater inertia to the pendulum, but I find that an ample range of time adjustment can be obtained with the single pendulum bob 109. The escapement wheel 101 tends to rotate in the direction indicated by the arrow, whereby each successive pin 102 is brought up into engagement with the under side of the lower flange 105. It will be noted that this flange is inclined upwardly toward the flange 106, and that this latter flange is also inclined upwardly in reverse direction. The torque of the pin 102 bearing against the under side of the flange 105 tends to cam or rock the flange 105 to the right so as to permit the pin to rise along the under side of the flange. This results in the pendulum swinging to the left and the pin sliding up along the under side of the flange 105 until it trips off the end of this flange and engages the upper flange 106. The reverse inclination of this flange tends to swing the pendulum in the other direction, and in this motion the pin passes up between the flanges and finally clears the end of the upper flange 106. It will be observed that irrespective of the position of the escapement wheel 101, the escapement will always be capable of starting itself whenever a tension is imparted to the spring 92. The present construction of escapement is always self-starting for any position of the parts, which is of considerable importance in the present adaptation because of the impracticability of manually starting each escapement mechanism.

After the electric motor 63 has revolved the shaft 74 through the necessary 180 degrees to actuate the corresponding semaphore arm, the circuit of the motor is interrupted by a quick break switch 111. As shown in Figures 6 and 9, this switch comprises a rocker 112 which is pivoted on a bearing pin 113 (Fig. 7) extending between the end bearing standards 76 and 107. The outer end of the rocker member 112 detachably carries a carbon block contact 114 which is adapted to make bridging contact across a pair of upright carbon contacts 115. These carbon contacts are supported in suitable cup receptacles which are secured to a bar 116 of fibre or other insulation, this insulating bar being suitably secured to the unit by screws 117. Binding posts 118 extend back from the carbon contact cups through the insulating bar 116 for connection with the circuit conductors, included in circuit with the motor 63. Extending from one end of the hub of the rocker member 112 is an arm 119 which is slotted at its end for mounting a roller 121; and extending from the other end of the rocker hub is an arm 122 carrying a plate forming a stop hook or finger 123. This stop hook is adapted to cooperate with a plurality of notches in the periphery of the disc 89 and performs the two-fold function of stopping and starting the time escapement mechanism and the associated contact drums 82 and 83, and also of controlling the closing of the switch 111. The notches in the disc 89 are best illustrated in Figures 9ᴀ and 12 from which it will be noted that the disc 89 of the upper motor unit has two comparatively narrow notches 100 and 110 in close relation and a longer notch 120 spaced slightly therefrom. Both shoulders of each of the notches 100 and 110 are cut abruptly or are even undercut slightly to insure a quick throw of the stop hook or finger into the notch for obtaining a rapid closing of the switch 111. These abrupt shoulders also function to lock the disc 89 and its associated contact drums against motion when the finger is engaging in either of the notches 100 or 110. The third notch 120 has an abrupt leading edge for securing a quick closing of the switch 111, but the trailing edge is sloped gradually so as to cam the stop hook 123 out of the notch and not stop the disc 89. When the stop hook 123 is riding on the high periphery of the disc between the notches 100, 110 and 120, it is holding the switch 111 in open position, and in this respect the position of these notches controls the closing of this switch. In the case of the lower motor unit 53 the arrangement is very similar, the disc 89' having a narrow notch 130 followed by a longer notch 140, both of which have abrupt shoulders on their trailing ends capable of locking the disc against motion. A third notch 150 is also provided, having a sloped trailing edge similar to the notch 120 of the upper disc for camming the stop hook out of the notch. The functional relation of these notches in the cycle of operations and the relative timing between the notches will be described at length in a subsequent part of the description.

When the semaphore has been moved to its proper position, the motor circuit is opened and the escapement mechanism and contact drums are released under the action of a tripping cam 124. This tripping cam is mounted on and driven by the actuating shaft 74 and is adapted to engage with the roller 121 for oscillating the rocker member 112 upwardly. The roller 121 is normally held up in the path of the tripping cam 124, with the contact 114 in shunt of the contacts 115—115', by a compression spring 125 which bears against the bottom of the rocker member and is supported at its lower end on an adjusting screw 126. Both ends of the cam 124 perform the operation of opening the motor switch 111, and this cam is rotatably mounted on the shaft 74 so as to have a lost motion connection therewith. This lost motion connection is obtained by disposing one end of the cam between two laterally projecting pins 127—127' extending from the face of the disc 94. A spiral spring 128 which is wound about the hub of the tripping cam 124 has one end connected to the cam and the other end connected to the disc 94 in such manner as to normally tend to rotate the tripping cam down against the lower pin 127. When the shaft 74 is approaching the end of its half revolution required to bring the semaphore arm into proper position, the cam 124 engages with the roller 121 while advancing with the shaft 74 in contact with the pin 127. The compression of the spring 125 is so adjusted that the initial engagement of the cam with the roller 121 will not suffice to open the motor switch, but the cam will come to rest momentarily by virtue of its lost motion connection, during which time a tension is being imparted to the spring 128. When the pressure in this latter spring exceeds the pressure exerted by the spring 125, the rocker member 112 will be swung up with a quick motion, thereby interrupting the motor circuit and preventing or extinguishing any arc between the contacts 114 and 115. This spring snap imparted to the cam 124 also prevents the mechanism from stalling, such as might result from separating the contacts 114—115 without releasing the disc 89 and its associated time escapement mechanism. The rocker member 112 has the two-fold function of opening the switch 111 and releasing the time escapement mechanism with its associated contact drums 82 and 83, and these operations should occur positively and substantially simultaneously. The rear pin 127' operates as a positive stop for the lost motion of the tripping cam 124 and insures a positive opening of the switch when the shaft 74 has been rotated through its required angular motion.

This switch has series connections through contact mechanism associated with the contact drums 82 and 83 which I shall now describe.

Associated with the contact drum 82 are three spring contact fingers 131, 132 and 133, mounted in parallel alignment on the insulating block 116 and fastened thereto by bolts or screws 134 which also serve as binding posts for making electrical connections with the contact fingers. The contacting fingers above mentioned are spaced away from the drum 82 so as to normally remain out of contact therewith, the contacting relation being established by arcuate segments which project outwardly from the drum for making a wiping contact with the spring fingers. These contacting segments are of different angular dimensions and may be either formed integral with the body of the hub or may be constructed in the form of separate discs which can be angularly adjusted with respect to each other and to the drum. The other drum 83 is also provided with a corresponding series of three contact fingers 136, 137 and 138 and similarly mounted in the insulating block 116. This contacting drum is likewise provided with a series of contact segments for establishing electrical connection through the three contact fingers in different sequence in accordance with the cycle of operations. These contact segments, in the case of the drum 83 as well as the drum 82, function to establish electrical connection between the drum and the associated contact fingers. Thus the instant at which current flow is set up through each of the contact fingers and the duration of such current flow can be widely adjusted by the substitution or adjustment of these contact drums. One method of performing such adjustment is by loosening the screw threaded flange 88 so as to release the clamping pressure from the contact drums to permit their angular adjustment on their common mounting hub. The two motor units for the two semaphore arms each have this same arrangement of contact drums having segments thereon adapted to make connection with spring contact fingers, the only difference residing in the timing and relation of the contacting segments on the upper and lower motor units. For brevity of description I shall therefore employ the same reference characters to designate corresponding parts of this contact mechanism between the upper and lower units, affixing a prime to the numerals applied to the lower unit 53. The manner in which these contacting segments and fingers perform the control functions for their individual signals, and also the simultaneous, progressive or retrogressive sequence of operation between successive signals will now be described in connection with the circuit diagrams of Figures 12 to 15.

In Figure 12, the common energizing circuit of the signals along a given thoroughfare or in a particular locality is illustrated by the wires 141, 142 and 168. For clarity of description, I shall refer to the wire 142 as a "common return", but it is not to be inferred therefrom that the system necessarily requires direct current, as it will operate equally well on alternating current. The tracing of the circuit diagrams will be facilitated, however, by considering the system as operating on direct current and by considering that the "common return" wire 142 connects to the negative terminal of the source of power 170. The source of power can be thrown into or out of connection with the feeder circuit extending to the signals through the switch 171. The third wire 168 is adapted to be thrown into or out of connection with the wire 142 or negative side of the generator 170 through the switch 169. Still considering the wire 142 as the "negative" side of the circuit, the negative side of the circuit is carried alternately between wires 142 and 168. That is to say, the negative side of the circuit is completed through wire 168 during one-fourth of the cycle when the boulevard arm is moving down from a "go" to a "stop" position, and during the remaining three-fourths of the cycle is completed through wire 141. The purpose of the wire 168 is primarily to perform a control function, either between the power house or other point of control and the system of signals or between successive signals and I have therefore termed this wire 168 the "power house" or "control" wire.

The initial or starting position of the signal is with the boulevard arm up in a "go" position and the cross-street arm down in a "stop" position. In order that we may first consider that side of the circuit completed through wire 141, however, we shall start with both semaphore arms down in "stop" positions. This corresponds with position A of the notched discs 89—89' and the contact drums 82—83 and 82'—83' as shown in Fig. 12. In this figure important steps in the cycle have been illustrated by the three positions A, B and C of the two control units for the upper and lower motors 63 and 63'. At each signal the circuit wire 141 extends up through the supporting column and makes connection with the contact finger 133 of the upper motor unit 56. The current impressed upon the contact finger 133 will flow through the contact segment 143 down to the intermediate contact segment 144 and to the endmost contact segment 145. It will be noted that at this time the circuit is closed between the contact segment 144 and its corresponding contact finger 132, while the circuit is open between the end contact segment 145 and its associated finger 131. Hence current will flow out through contact finger 132 and up through wire 146 to one of the carbon contacts 115 of the quick-break switch 111. This switch is closed at this time by reason of the engagement of the stop finger 123 in the notch 110 in the disc 89, whence current will flow down through the other carbon contact 115 and through wire 147 to the middle contact finger 137. Here this finger will complete connection with a contact segment 148 on the drum 83, by which the current will be conducted down to a lower contact segment 149 which is in connection with the contact finger 136 (it being noted that the upper contact segment 151 is out of engagement with the corresponding contact finger 138). From the finger 136 the current will therefore be conducted down through wire 152 to one of the carbon contacts 115'—115' of the quick-break switch for the lower motor unit. This quick-break switch is also closed at this time by reason of the stop finger 123' reposing in a notch 140 in the disc 89' of the lower unit. Consequently the current will be conducted down through the other carbon brush 115' and through wire 153 to the contact finger 137'. This finger is in engagement with contact segment 154 on the drum 83'. Adapted for co-operation with the contact finger 138' is a pair of segments 155 and 156, and adapted for co-operation with the finger 136' is a segment 157. The latter is out of engagement with its contact finger, but the contact 155 is in engagement with the finger 138', whereby the circuit is continued through the latter and through wire 158 to one side of the lower motor 63'. The current will flow through the windings of the motor and from the other terminal thereof the circuit is continued up through wire 159 to the contact brush 90 of the interlock ring 30 on the semaphore shaft 42 operated by the other motor unit. This semaphore arm having been previously moved into a full horizontal position, the circuit through this interlock will be completed out through the other brush 80 and down to the common return wire 142 of the feeder circuit. The circuit having been completed through motor 63', this motor will revolve and drive its arm 24 up into upright position. When the arm is in full upright position the circuit is interrupted by the opening of the switch 111' as before described, whereby the motor is stopped and the escapement mechanism is released for the advancement of the contact drums 82' and 83'. The direction of rotation of the disc 89' being as indicated, it will be apparent that the disc (and thereby the contact drum) will be revolved around until the stop 123' slips into the square-cut notch 130 and locks the disc and contact drum against further rotation. (It will be noted that during this rotation of the disc 89' the stop finger 123' moves into and out of the notch 150, not stopping the disc, however, because of the inclined face at the end of the notch. The brief closure of the switch 111' at this time performs the progressive or retrogressive control which I shall hereinafter describe. The circuit through the motor is not re-established upon the short closure of this switch 111', however, because all three contact fingers are out of contact with their corresponding segments at this time.)

Rotation of the disc 89' into position B brings the segment 154 back into contact with the contact finger 137' and brings the segment 156 into engagement with the contact finger 138'. When the stop finger 123' slips into the notch 130 the switch 111' is closed and the motor circuit re-established through the segments 154 and 156. The semaphore arm 24 having been previously swung into its upright position will now be revolved back into a horizontal position; upon the completion of which the motor circuit will be automatically broken and the escapement mechanism released by the rocking of the stop finger 123'. Immediately the disc 89' will start advancing and will move only a short distance when the stop finger will swing into the longer notch 140. This corresponds with position C, from which it will be observed that when the stop finger slips into the fore part of the notch 140 the segment 154 is still in contact with finger 137', and the segment 157 has moved into contact with its finger 136', neither one of the upper segments 155 and 156 being in contact with their corresponding finger 138'. The inward movement of the stop finger 123' closes the switch 111' and consequently a circuit is established down through wire 153, contact finger 137', segment 154, segment 157, and contact finger 136' to wire 162. This wire energizes the upper motor 63. It should be noted that it only requires a few seconds to revolve the semaphore arm from one position to another, and consequently the wire need be energized only a short time. The length of the segment 157 and the length of the notch 140 are such that current will be impressed on wire 162 for the requisite period, interruption of the motor circuit being effected by the upper switch 111.

It will be noted that because of the disconnection of contact finger 138' there is no potential effective on the wire 158 for moving the motor 63'. The wire 162, which is now live through the connections above traced, extends up to the upper motor unit 56 where it has connection with the contact finger 138, and by way of the branch wire 163, with the upper motor 63. From the other terminal of the upper motor 63, the circuit is extended by way of wire 164 up to the brush 50 of the electrical interlock on the lower semaphore shaft 37. This semaphore arm now being in its horizontal position, the circuit will be completed through the contact segment and brush 60 through wire 165 to the common return 142 of the feeder circuit. Consequently upper motor 63 will commence rotating, while lower motor 63' remains inert, thereby revolving the boulevard semaphore arm 25 up into upright position. It will be observed that this occurs subsequent to the operation of swinging the cross-street semaphore arm down into horizontal position, and only begins after this arm 24 has completed its movement into this horizontal position. After the upper motor 63 has revolved its semaphore arm 25 up into upright position, the motor circuit is opened by the automatic actuation of its corresponding switch 111 and the time escapement and contact drums are simultaneously released for performing their timing function. Subsequently to the opening of the upper motor switch the circuit through wire 162 is also interrupted by the segment 157 revolving out of contact with the finger 136', at which time the contact drums and notched disc of the lower motor unit resume position A. The contact drums of the upper motor unit are at this time in position A, from which it will be noted that contact finger 138 which is in connection with the live wire 162 is out of contact with its segment 151. When the stop finger 123 is tripped out of the notch 110 it rides on the periphery of the disc until the notch 120 comes under the stop finger, whereupon the stop finger drops into this notch for closing the switch 111 in the performance of the progressive or retrogressive timing function. These timing functions I shall hereinafter describe in connection with the appropriate circuit diagrams, so we need not consider the action of closing the switch 111 at this time. However, it will be observed that such closure of the switch is not operative to drive the upper motor 63 because as before described, the segment 157 has revolved away from the finger 136' and has broken the circuit through the wire 162. The inclined face at the end of the notch 120 prevents stopping of the disc by merely camming the stop finger 123 out onto the periphery of the disc where it rides continuously until it drops into notch 100. This corresponds with position C in the upper part of the diagram, from whence it will be noted that the segments 151 and 148 are in contact with their respective fingers 138 and 137, and the segments 144 and 145 on the other drum are in contact with their respective fingers 132 and 131. The circuit for the upper motor is therefore completed as follows: Tracing the circuit from the common return 142, the circuit is through the interlock mechanism 40—50—60 on the lower semaphore shaft, which is closed at this time, through wire 164, motor 63, wires 163 and 162, contact finger 138, segments 151 and 148, contact finger 137 and wire 147 to motor switch 111 which is closed at this time. From the other side of the motor switch the circuit continues down through wire 146 to contact finger 132 and thence through segments 144 and 145 and contact finger 131 to the control or "power house"

line 168. This power house line has connection with the opposite terminal of the source of power from the common return 142, so that a power circuit is completed through motor 63. It is opportune at this point to explain the function of this power house line. It will be noted that if it were attempted to complete the circuit through wire 141 the boulevard semaphore arm 25 would remain stalled in its upright "go" position. This is because the spring finger 133 with which this wire connects is out of contact with the corresponding segment 143 when the boulevard arm is upright, corresponding to the C position. However, by reason of the "power house" line completing the motor circuit for the upper motor 63 through the contact finger 131 and segment 145 instead of through the open connection at the finger 133 and segment 143 the upper motor is not stalled but becomes operative to run the boulevard semaphore arm to its down position. When it is desirable to discontinue the operation of the signaling system after the heavy traffic has subsided, for example at night after the theatre traffic has ended, the power house line 168 is disconnected from the source of power by opening the switch 169 but power is kept on wire 141 for a short time by retaining the switch 171 closed. As a consequence the signal unit will continue operating until it reaches that condition where the cross-street semaphore is down in a "stop" position and the boulevard semaphore is up in a "go" position. At this time the upper motor will become stalled by reason of the break in its circuit at contact finger 133 and segment 143, and consequently the entire signal unit will remain in this condition. The other signal units along the boulevard will likewise assume this condition, as I shall presently describe; these several signals for the rest of the night giving a "go" indication to all traffic along the boulevard and a "stop" indication to all traffic on the cross-streets at the intersection with the boulevard. This is in accordance with the popular traffic rule now prevailing of requiring cross-street traffic to come to a full stop before crossing a boulevard. After a short time interval ample to allow all of the boulevard signal units to assume this condition the current may be taken off of the feeder circuit lines 141 and 142 by opening the switch 171, but this is not essential as the circuit is completely broken in so far as operation is concerned by the opening of switch 169.

In the morning the signal units are set into operation automatically by closing the switches 171 and 169. Impressing a potential on the power house line 168 will complete the motor circuit for the upper motor 63 through the contact finger 131 and segment 145. Consequently this motor will run the boulevard arm down and, upon tripping open the motor switch 111, will set the notched disc 89 and contact drums into motion. The notched disc 89 will only advance the comparatively short distance to the adjacent notch 110, when the stop finger 123 will enter and stop the parts in position A. This completes the circuit for the lower motor 63', and corresponds to the point from which the description of the operation started, the entire cycle of that signal unit being completed.

In Fig. 13 I have shown diagrammatically the connected circuits of two signals connected for actuation in unison. These two signals are representative of any number of signals connected together for operation in unison. To simplify the circuit diagrams I have omitted the electrical interlocks 40—50—60 and 70—80—90 from the motor circuits but it will be obvious that they are merely included in series with their respective motors as illustrated in Fig. 12. From this as well as the remaining diagrams I have, for clarity, omitted the portions of the contact drums not involved in the circuits. The first and second signal units in the system are represented at the left and right-hand sides of the diagram respectively. All the signal units have continuous connection with the feeder circuit consisting of the primary wire 141 and the common return 142. The operation of the several signals in unison is obtained through control lines 168—168' connecting the successive signals. These control lines correspond in the case of each particular signal unit to the power house line 168 described in Figure 12. One signal is a master unit, which we shall consider as signal #1 in the diagram, and to this signal unit extends the power house line 168 for starting or shutting off the entire circuit. From the master unit a control wire 168' extends to signal #2, a similar control wire 168' extends from signal #2 to signal #3 and so on through the entire series adapted for operation in unison. The master unit #1 places a potential on the successive control wires 168' extending down along the line of signals, this potential being conveniently considered as a control impulse for simultaneously setting all the signal units into operation. After having been set in operation each signal unit will operate through a complete cycle independently of any potential placed upon the control wires 168', and will return to an original or zero position, awaiting a second control impulse to be transmitted down through the series of control wires 168' for again setting the series of secondary signal units into operation.

Each signal unit is controlled by a four-pole double throw switch 172, which is preferably mounted adjacent the base of the supporting column or tower so as to be in position for convenient operation. By throwing the switch into its upper position into contact with the four upper terminals the signal unit can be cut into the system for simultaneous operation with the other signals. By throwing the switch downwardly, the corresponding signal unit can be cut out of the system without disturbing the operation of the remaining signal units in the system. When thrown downwardly, the switch operates to connect the control wires 168'—168' together on each side of the signal unit through the shunt 173 which is connected between the two lower terminals 174 and 175. When the switch 172 is thrown upwardly the signal unit is cut into operation in substantially the same circuit arrangement described of Figure 12. For example, the wire 141 is connected by way of wire 141' with the contact finger 133 of the upper timing mechanism. The common control wire 142 is also connected by way of wire 164, with the lower and upper motors 63'—63, it being understood that the electrical interlocks previously described are preferably included in these motor circuits. From the cycle of operations previously described in connection with Figure 12, it will be apparent that the power supplied to each signal unit through the wires 141 and 142 is adequate to drive these signal units through three fourths of the complete cycle, ending with that condition in which the cross-street semaphore is down in a "stop" position and the boulevard semaphore is up in a "go" position. It will be remembered that in the absence of a potential impressed upon the power house or control line 168, the unit would stall or stop in that position. This is the position to which all of the signal units subordinate to the master unit return, and from which position all simultaneously start into actuation by a power impulse transmitted down through the controlling wires 168'. The power house line 168 is connected to contact finger 131 by way of wire 178, and when the master signal #1 reaches this zero starting condition the potential effective on the power house line is transmitted through contact segments 145—144, contact finger 132, wire 146, switch 111, wire 147, contact finger 137, contact segments 148 and 151, contact finger 138, wire 167, which extends down to the switch 172 for making connection with the control wire 168' leading to signal unit #2. Wire 163 branches off of wire 167 and connects with the upper motor 63, the other terminal of which connects through wire 164 and switch 172 with the common return 142. The circuit above traced is closed when the stop finger 123 drops into the notch 100, at which time the boulevard arm is up in its "go" position and the required time interval has elapsed preparatory to moving the boulevard arm into its down position. This occurs as beforesaid, when the stop hook 123 drops into notch 100, whereupon the upper motor 63 is energized and the boulevard arm begins to rotate down to a stop position. Simultaneously with the energization of the upper motor 63 a power or control impulse or current is established upon the adjacent control wire 168' leading to the second signal unit. This second signal unit will be in the same zero position with its boulevard arm upright and its cross-street arm down, corresponding to position C of Figure 12, whereby a circuit will be established through the upper motor 63 and the current impressed upon the control wire 168' will be continued down through wire 167 to the control wire 168' leading to the next succeeding signal unit. The upper motor of this next unit will be simultaneously energized and the power impulse will continue down the line and energize all of the upper motors 63 so as to simultaneously revolve the boulevard arms of all the signal units down into their "stop" positions. After being set in operation each signal unit will go through its complete cycle of lowering the boulevard arm to a stop position, raising the cross-street arm to a go position, lowering the cross-street arm to a stop position, and raising the boulevard arm to a go position. The timing mechanisms for the second, third, fourth, etc., signal units are preferably adjusted so that each of these signals will return to its zero position with the boulevard arm upright slightly in advance of the master signal #1, so that when the energizing impulse is sent out from the master signal through the control wires 168' the subordinate signals will be in condition for immediately taking up operation from their zero positions. It will be apparent that at night after the theater traffic has subsided, all signal units can be brought to this zero position with their cross-street arms down and their boulevard arms up by merely disconnecting the power house line 168 leading to the master signal #1. If the signals are in the course of a cycle, such operation will be continued from the power derived from the feeder circuit 141—142 until the master signal and all the subordinate signals return to the aforesaid zero position, where they will cease all operation until the power house line 168 is again energized the next morning.

Figure 14 illustrates the circuit connection employed for a progressive or consecutive sequence of operation of the several signals. For such mode of operation, the circuit connections are very similar to those employed when the signals operate in unison (Fig. 13); however, the control or operating impulse for the next signal emanates from lower contact drum 82' of the lower or cross-street semaphore unit, instead of from the upper motor unit as in the previous arrangement. The circuit connections of Figure 13 are merely extended by continuing the wire 153 down to the contact finger 133' and extending a wire 181 from the contact finger 132' to the switch contact 182 adapted for connection with the control wire 168'. The contact finger 133' is adapted to make contact with a segment 183, and the contact finger 132' is adapted to make contact with a segment 184, these two segments being timed so as to substantially make and break contact with their respective contact fingers simultaneously. These segments preferably consist of a unitary segment of metal extending across the width of both contact fingers. These two contact segments are timed with the notch 150 in the disc 89' so that these segments will complete the circuit through the contact fingers 133'—132' when the stop finger 123' drops into the notch 150 and closes the switch 111'. When such a circuit is completed through the contact fingers 133'—132' by the closing of the switch 111' a control or operating impulse is sent out along the control wire 168' to the next signal unit for setting that signal unit into operation. It will be recalled that the stop finger 123' drops into the notch 150 after the lower cross-street arm has been moved to an upper or "go" position, and while the time escapement mechanism is measuring the time interval that such cross-street arm is to remain in its open position. At this time the boulevard arm is of course down. In the timing relation illustrated, this control impulse is sent out on the control wire at a time substantially in the middle of the time interval of the open position of the cross-street arm. The circuit for this current impulse between signals #1 and 2 is as follows: Current is drawn from the wire 141 up through switch 172 and wire 141' to the contact finger 133 of the upper motor unit. The upper or boulevard arm is in its down position at this time, and accordingly the stop finger will repose in notch 110, (position A, Fig. 12). Accordingly, the circuit will continue from finger 133 through segments 143 and 144 contact finger 132, wire 146, switch 111, wire 147, contact finger 137, contact segments 148 and 149, contact finger 136, wire 152 to the switch 111' of the lower motor unit. This switch having been closed by the stop finger 123' dropping into notch 150 (the cross-street arm now being up) the circuit is continued down through wire 153 to contact finger 133' through contact segments 183—184, contact finger 132', wire 181, contact 182 and switch 172 to the control wire 168' leading to the next signal unit. Here this control wire makes connection with the wire 178 leading up to the contact finger 131 of the upper motor unit, as described of the previous circuit connection illustrated in Figure 13.

This signal unit having come to rest with the boulevard arm open and the cross-street arm closed, the segment 145 will be in contact with the finger 131 so that this current impulse will be operative to start the upper motor 63 in operation and run the boulevard arm down. The circuit through which this current impulse sets the motor 63 into operation has been traced before and need not be described again. Upon bringing the boulevard arm down into closed position, the signal is set into motion for operation independent of current derived from the control wire 168', and the signal goes through its complete cycle returning again to its zero or stop position with the boulevard arm open and the cross-street arm closed. While this second signal is in the course of its cycle, and during the time that the cross-street arm is open, the stop finger 123' of the lower motor unit drops into its corresponding notch 150 and transmits a power impulse out along wire 168' to the third signal unit. Here the above cycle is again repeated. Each control or power impulse transmitted from one signal to the other by way of the control wire 168' returns to the common return side 142 through wire 164 connecting through the switch 172 with the common return 142.

The progressive sequence in which the boulevard semaphore arms move down into closed position and up into open position will be apparent from the foregoing. As each boulevard arm moves down into its closed position, its corresponding cross-street arm moves up into its open position, and subsequently thereto a power impulse is sent on the next signal for moving its boulevard arm down into closed position. The two boulevard arms having both moved down to closed position in progressive sequence will both move up to open position in progressive sequence. It will be apparent that the time interval elapsing between the movement of one boulevard arm to open position and the movement of the succeeding boulevard arm to open position can be widely varied by changing the location of the notch 150 about the periphery of the disc 89'. For example, if the notch 150 were disposed in close proximity to the notch 140, the power impulse would be transmitted to the next signal unit very soon after the lower cross-street semaphore had moved to open position. (This would mean a comparatively short time interval between the opening of the successive boulevard arms because the cross-street arm of each signal unit moves in close succession to the movement of its corresponding boulevard arm). By moving the notch 150 back in the other direction into proximity to the notch 130, this time interval could be increased considerably. The contact segments 183 and 184 must of course be similarly adjusted with any new timed relation of the notch 150.

A wide variety of different traffic conditions can be taken care of conveniently in the present mode of operation by the individual time adjustments of the escapement mechanisms for the different semaphore arms. When a current impulse is transmitted to a signal unit and its boulevard arm moves down, its cross-street arm moves up and the time escapement for the lower motor unit corresponding to the cross-street arm is set into motion. Upon this time escapement mechanism any regulation may be imposed depending upon the traffic conditions at that particular section. For example, if the cross-street traffic at this point is heavy, the time-escapement mechanism may be adjusted for holding the cross-street arm open for a considerable time interval, or, conversely, if the cross-street traffic is light, this time escapement mechanism can be adjusted to close the cross-street arm after a short interval. After the cross-street arm is moved to closed position, the boulevard arm moves to open position and remains there until a power impulse is transmitted along its entering control wire 168'. The length of time during which this boulevard arm remains in its open position can be widely varied by appropriate location of the notch 150 in the disc 89' of the previous signal, and also by adjustment of the time escapement mechanism which controls the rate of advance of this disc 89' in the previous signal. For example, if the distance between successive signals was such that a car traveling twenty miles an hour or any other traffic speed desirable for that district required twelve seconds to traverse the distance between these successive signal units, this selected time interval of twelve seconds can be accurately obtained by correspondingly locating the notch 150 about the periphery of the disc 89' in the previous or anterior signal unit and by controlling the rate of advance of this disc 89' by regulation of its time escapement mechanism. It will be observed that by this mode of operating the signals, traffic may be maintained in uninterrupted movement along a thoroughfare or stretch thereof at a certain sanctioned speed, but if any motorist exceeds this speed limit he promptly runs into signals in their stop positions.

In referring to the mode of operation of the system illustrated in Figure 14 as being progressive in sequence, it was assumed that the major portion of the traffic was traveling in a direction from signal #1 to signal #2. Obviously, a retrogressive sequence could be obtained by arranging the signals reversely so that the direction of the traffic would be from signal #2 to signal #1. Another method of obtaining this retrogressive sequence of operation is illustrated in the circuit diagram of Figure 15. This circuit arrangement may likewise be considered progressive or retrogressive depending upon the direction of traffic with respect to the order of the signals, but inasmuch as the present circuit arrangement is best adapted for a retrogressive sequence, we shall consider the traffic coming from signal #2 toward signal #1 for this sequence of operation. In this arrangement the control impulse of current emanates from the contact drum 83 of the upper motor unit. This control impulse is transmitted through a secondary contact finger 187 which is disposed in the plane of the contact finger 136 for engagement with the segment 149. This contact finger 187 is disposed a distance beyond the contact finger 136 corresponding to the angular distance between the notches 110 and 120. Extending from this secondary contact finger 187 is a wire 188, leading down to the terminal 182 of the switch 172, which terminal 182 is adapted for connection with the control wire 168' extending to the next signal unit. The remainder of the circuit is substantially the same as the preceding circuit illustrated in Figures 12 and 13. The position of the notched disc 89 and the commutator segments in the case of each motor unit (signal #1) corresponds to the down or stop positions of both semaphore arms. Current entering signal #1 will energize the upper motor 63 and swing the boulevard arm up to a "go" position. With the termination of this upward movement of the boulevard arm, the stop finger 123 will be tripped out of the notch 110 and the disc 89 will rotate around to present the notch 120. When the stop finger slips into this latter notch 120, the contact segment 149 is in contact with the finger 187, so that with the closure of the switch 111 a control impulse of current is sent out along the control wire 168' to the next signal unit. This control impulse may be traced as follows: From the outer feeder wire 141 up through switch 172 and wire 141' to the contact finger 133, through contact segments 143 and 144, contact finger 132, wire 146, switch 111, wire 147, contact finger 137, segments 148 and 149, secondary contact finger 187, wire 188, switch terminal 182 and switch 172 to the control wire 168' leading to the next signal. This next signal, being in its zero or initial position with the boulevard arm up, a current impulse will flow through the customary path through the contact fingers and segments of the upper motor unit and will energize the upper motor 63 to move its corresponding boulevard arm down to a stop position and thereby set that particular signal into motion. This signal will in turn revolve its cross-street semaphore up to a "go" position, will move the semaphore back to a "stop" position, and will then move the boulevard arm up to a "go" position, after which, upon the termination of the desired time interval, a control impulse will be sent out from this signal to the next succeeding signal by the stop finger 123 dropping into the notch 120 and closing the switch 111 and the control circuit through contact finger 187. Obviously, the time interval elapsing between the retrogressive movement of the boulevard arms can be widely varied by the appropriate locations of the notches 120 in the discs 89 of the several signals. For example, if a considerable distance intervenes between one signal and the next signal which it controls, the notch 120 can be spaced back around the circumference of the disc 89 so as to interpose a longer time interval commensurate with the greater distance. Similarly, by adjusting the time escapement mechanisms of the upper and lower motor units the opening and closing movements of the different semaphore arms can be adjusted within a wide range to accommodate the different traffic conditions existing at the different intersections with the boulevard.

It may be desirable to so arrange the system that it can be easily converted from a progressive to a retrogressive mode of operation, or vice versa; as for example, to employ one mode of operation when the traffic is going downtown in the morning and another when the traffic is returning in the evening. As shown in Figure 12, this is easily accomplished through the manipulation of a switch 247 at each signal unit. The blade of the switch connects to wire 168 leading to the next signal and the two terminals 248 and 249 connect to wires 188 and 181. By throwing the switch to either side the control wire 168 can then be connected to either of the contact fingers 187 or 132'.

In Fig. 17 I have illustrated diagrammatically master timing mechanism which may be employed to lengthen the time intervals elapsing between the movements of the semaphore arms of the several signals. This mechanism functions by periodically interrupting the current supply to the master signal or system of signals in certain timed relation with the movement of the semaphore arms, and thereby slowing up the frequency of movement of the arms. For example, if the several signals along a boulevard or thoroughfare were adjusted to give thirty seconds right-of-way to the boulevard traffic and fifteen seconds right-of-way to the cross street traffic, by the interposition of this master timing unit these respective time intervals could be lengthened to practically any time desired. For example the thirty seconds could be lengthened to sixty seconds for the boulevard traffic and the fifteen seconds could be lengthened to thirty seconds for the cross street traffic. This is a further control step which may or may not be employed in conjunction with any one of the preceding circuit arrangements just described. The use of such master timing mechanism adds flexibility to the system, however, in that it permits of the use of comparatively short time intervals during heavy traffic congestion and long time intervals at night or during periods of light traffic load without the necessity of an operator proceeding to each signal unit and making an independent adjustment of its escapement mechanism. A three pole double throw switch 191 contacts the continuous application of power to the circuit leading to the signals, or the intermittent application of power through the medium of the master timer unit 192. Leading from the power house or other source of supply to the right hand terminals 193 and 194 of the switch 191 are the wires 141 and 168. The wire 141 is the wire that conducts current to each signal during three-fourths of its cycle and wire 168 is the power house or control wire that conducts current to each signal during the remaining one-fourth of its cycle. It will be remembered that when current is taken off the power house wire 168 all signals return to their initial or zero positions with the boulevard arms up and the cross street arms down. The first two of the three terminals 195, 196 and 197 of the switch 191 are connected respectively to wires 141' and 168' which extend out along the thoroughfare to the various signals in the system, these wires 141' and 168' corresponding to the wires 141 and 168 as considered in the above described circuit diagrams. The common return 142 extending from the generator or other source of power 170 has a branch extension 142' paralleling the two wires 141' and 168' and extending out to the various signals in the system. The third blade terminal 197 is connected by a jumper wire 198 with the feeder wire 141. The other three terminals 201, 202 and 203 of the switch are connected respectively with wires 204, 205 and 206 leading to the timing unit 192. This timing unit is very similar to the time measuring mechanism employed for each of the semaphore arms in the different signal units. A motor 207 is periodically operated to store up energy in a spring similar to the spring 92 for driving the notched disc 208 and the contact drum represented by the four circles 209. Cooperating with the disc 108 is a switch 211 having the same general method of operation as the switches 111 and 111' previously described. The stop finger 212 which controls the movement of the disc 208 is adapted for movement into and out of three notches 213, 214 and 215 in the periphery of the disc 208. The notch 213 has substantially square shoulders at each end and functions to positively stop the motion of the disc, while the notches 214 and 215 have their trailing ends sloped up to the periphery of the disc so that they merely function as circuit closing notches for closing the switch 211 without stopping the motion of the disc 208.

The wire 204 extends up to a contact finger 216 for making contact in the second plane of the contact drum. The wire 205 extends up to a contact finger 217 disposed in the third plane of the contact drum; while the wire 206 extends up to one of the contacts 218 of the snap action switch 211. From the other terminal 218' of this switch a wire 219 extends down to a contact finger 221 disposed in the first plane of the contact drum. A fourth contact finger 222 disposed in the fourth plane of the contact drum connects by way of wire 223 with one terminal of the motor 207. The other terminal of the motor has connection through wire 224 with the common return 142. Adapted for arrangement with the first contact finger 221 are three contact segments 225, 226 and 227. Adapted for engagement with the second contact finger 216 are two contact segments 228 and 229 which are connected to and disposed in the same timed relation with the contact segments 226 and 227. Adapted for engagement with the third contact finger 217 is a single contact segment 231 which is connected to and arranged in the same timed relation as the contacts 226 and 228. The fourth contact finger 222 is adapted to make contact with a single contact segment 232 which is disposed so as to make contact with its corresponding finger 222 simultaneously with the making and breaking of contact between the segment 225 and its corresponding finger 221.

When the switch 191 is thrown over to the right it will be apparent that the continuous voltage of the power house supply 170 will be transmitted up to the wires 141', 142' and 168', and that the several signal units will operate in accordance with the timing given their individual time escapement mechanisms. When, however, the switch 191 is thrown over to the left current is only transmitted through the wires 141', 142' and 168' intermittently in accordance with the timing function of the unit 192. When the switch is thrown to the left with the parts in the position indicated, it will be apparent that current will be transmitted over wire 141, through wire 198, switch terminals 197 and 203, through wire 206, switch terminals 218—218', wire 219, contact finger 221, contact segments 225 and 232, contact finger 222 and wire 223 to the motor 207. From the other terminal of the motor 207 the circuit is completed by way of wire 224 which connects with the common return 142 leading back to the power station. As a consequence, motor 207 is rotated, thereby storing up energy in the spring which drives the disc 208 and contact drum 209. At the completion of the desired rotation necessary for storing up energy in this spring, the stop finger 212 is tripped out of the notch 213 and the switch 211 is thereby opened. The notched disc 208 immediately starts its step by step advancement in the direction indicated by the arrow and at a rate determined by its individual time escapement mechanism. It will be noted that during all this time no power is being transmitted out along lines 141' and 168' and consequently the signals are not operating. The three contact segments 226, 228 and 231 are all in timed relation with the notch 214, and consequently when the stop finger 212 drops into this notch 214 and closes the switch 211 circuits will be established through these contact segments and their respective contact fingers 221, 216 and 217. The power which is continuously impressed upon the wire 206 during this left hand position of the switch 191 is immediately transmitted through switch 211 and contact finger 221 to the contact drum. From this drum power is transmitted through the contact segment 228 to its corresponding contact finger 216, and power is also transmitted through contact segment 231 to its individual contact finger 217. These two contact fingers in turn transmit the current through both wires 204 and 205 which connect respectively with wires 141' and 168' of the signal circuit. The signals which we will presume are now in their initial or zero positions, are now set into operation either simultaneously, progressively or retrogressively in accordance with the circuit hookup in which they are connected. For the purposes of illustration we shall assume that all of the signals are connected for operation in unison. Hence when current is impressed upon the wires 141' and 168' the boulevard arms of the entire group will first move to their down positions. Immediately after the cross street arms will move to their open positions.

The timing mechanisms for the several cross street arms will now start "timing", i. e. measuring the time interval their corresponding semaphore arms are to remain open. This time interval is measured by the switches 111' being held open by the high part of the disc 89' between the notches 140 and 130. During this timing interval the current flow through the wires 141' and 168' is interrupted at the timing unit 192. Consequently when the finger 123' drops into the notch 140 and the switch 111' is closed the lower motor 63' is not energized because there is no potential on wire 141'. The increased time interval during which the cross street arm is to remain open for night operation is now obtained by holding this circuit through wire 141' open at the timing mechanism 192. This increased time interval corresponds to the peripheral distance between the notches 214 and 215 on the disc 208.

When the notch 215 revolves under the stop finger 212, the closing of the switch 211 establishes a current flow through contact finger 221 and segment 227 to the contact drum 209. This circuit will be continued through contact 229 and contact finger 216 to the wire 204, but no circuit will be established through wire 205 because there is no contact segment making contact with the finger 217 at this time. Consequently, current will be transmitted out through wire 141', with which the wire 204 connects, whereby the stalled signal units will resume operation at the lapse of the increased time interval. Upon resumption of operation the cross street semaphore of each signal will be revolved to down position and the boulevard semaphore will immediately be revolved to its up position, this all occuring under the power transmitted through wire 141'. It will be recalled that this is the initial or zero position of each signal unit. As soon as the boulevard arm has been revolved into its upper "go" position the timing operation of the upper control mechanism starts. This timing interval corresponds to the peripheral distance between the notches 110 and 100 in the disc 89. During this timing interval the finger 212 is cammed out of the notch 215 and the circuit through the timing mechanism is broken. When the finger 123 drops into the notch 100 at the signal the upper motor is well reenergized because there is no potential at this time on the wire 168'. Consequently, the timing interval provided for at the signal is increased by the timing interval required for the disc 208, to revolve around and present the notch 214 to the finger 212. When this occurs a potential is again placed on wire 168' and the boulevard arm moves down. During the increased time interval for the boulevard arms determined by this master timing unit the stop finger 212 drops into the notch 213 and energizes the motor 207 for a sufficiently long period to restore the energy in the motive spring which drives the disc 208 and contact drum 209. After this energy has been stored in the spring the stop finger is tripped out of the notch 213 in substantially the same manner as described of the motor units for the semaphore arms whereupon the disc 208 resumes rotation. When the notch 214 comes under the finger 212 the closure of the switch 211 establishes a circuit through contact segment 231, contact finger 217, wire 205 and out through control wire 168' for moving the boulevard arms to a down position and again setting the signals into operation.

The selective control of the making and breaking of the circuits through wire 141' and 168' insures that the semaphore arms of the signal units will start off in step in the proper relation. If no lengthening of the timing interval for the cross street arms is desired the circuit through wire 141' need not be interrupted, and similarly for the boulevard arms and the wire 168'.

It will be apparent from the foregoing that by controlling the speed of rotation of the disc 208 and contact drum 209 and by disposing the notches in this disc and the segments on the drum in predetermined angular relationship, different ratios of timing can be had between the boulevard arms and the cross street arms; furthermore, the time intervals in which either of these arms remain in their open position can be extended indefinitely to practically any time interval by slowing up the rotation of the disc 208 sufficiently.

The different applications and advantages of the various methods of operation can best be illustrated by reference to a concrete situation. This I have done in Fig. 16, which is representative of a heavily congested portion of Michigan Boulevard in Chicago. Both the north and south bound traffic of this boulevard could be simultaneously controlled by a single set of signals at the various intersections, but the interference and congestion in the southbound traffic is considerably different from that in the northbound traffic, and accordingly, I have drawn upon this situation to illustrate two theories of operation and have therefore illustrated a separate set of signals for controlling the southbound traffic and a separate set of signals for controlling the northbound traffic. The southbound traffic is interrupted, as suggested, by a considerable volume of traffic radiating from each of the cross streets and either turning south on the west side of the boulevard or cutting across the boulevard and turning north on the east side thereof. For this southbound traffic and the cross street traffic radiating from the several cross streets opening onto the west side of the boulevard, I propose providing one set of signals A, B, C, D, E, F and G along the west side of the boulevard and at the near side of the cross streets. The northbound traffic on the east side of the boulevard may be controlled by a separate set of signals H, I, J and K located at the three cross streets which pass completely through the boulevard on this side. The signal I is representative of a signal provided for heavy pedestrian traffic, such as to a prominent building or the like, along one side of the thoroughfare. Referring first to the conditions existing along the west side of the boulevard, it will be apparent that the several signals A to G, inclusive, could be operated in unison with a time interval for the boulevard traffic corresponding to either one block of travel or a plurality of blocks of travel. Assuming for illustration a 30 second interval corresponding to approximately one block of travel, it will be observed that when a large cross street traffic turns south on the boulevard during the heavy traffic period there will be the possibility of congestion from the inability to get this cross street traffic ahead and out of the way of the ensuing boulevard traffic moving in the same direction. For example, assuming that a large volume of traffic has become bunched at signal D, and assuming that a large volume of cross street traffic enters from Madison street and turns south into the boulevard, it will be apparent that a goodly portion of the block will be very quickly filled. Hence, when the boulevard signals move to open position, the traffic which is now released by signal C will find the block ahead obstructed by a large volume of traffic which will get under way slowly. With the progressive sequence of operation the signals A, B, C, D. etc. would open to the boulevard traffic in the order named and with any desired time interval between the signals. In the retrogressive sequence the signals would open to the boulevard traffic in the order G, F, E, D, etc. One advantage of the latter method of operation is that it would get the cross street traffic which had turned into the boulevard from the lower cross streets away before the through traffic at the upper end of the boulevard would reach these lower cross streets.

On the east side of the boulevard the signals could be operated in accordance with either of the foregoing methods, although it is probable that a progressive sequence of operation would be preferable for this side. In this mode of operation the signal H would first block the north bound traffic to accumulate a bunched volume of traffic. Upon the opening of the boulevard arm at this signal this group of vehicles could proceed to the signal K without making a stop. For example, the signal I, in this mode of operation, would be arranged to open at a predetermined time after the opening of the signal H, and the signal J at a predetermined time after the opening of the signal I, so that these signals would open in direct succession in front of the approaching vehicles so that they could continue at a certain speed right through from signal H to signal K.

Where it is desirable that each signal along a thoroughfare operate independently, without either of the interlocking relations illustrated in Figures 13, 14 and 15 between successive signals, the power house wire 168 is extended continuously along the line of signals and each signal merely taps off this power house wire for connection with contact finger 131.

It may be desirable that one or more of the signals be capable of manual control by a traffic policeman or other operator having supervision of the traffic. To meet this requirement I contemplate interposing a manually operated switch 236 in the taps leading from wires 168 or 168' and 141, as shown in Figure 18, locating this switch conveniently to the operator controlling that particular signal. The switch is similar to a double pole, double throw design, having two central terminals 237 and 238, two end terminals 239 and 241 on one side but only one active terminal 242 on the other side. Obviously, switching mechanism having other arrangements of contacts may be employed, the above being merely illustrative. The tap 243 from wire 168 is connected to the central terminal 237. The tap 244 from the wire 141 is connected to the one end terminal 242, and by jumper wire 245 to the opposite end terminal 241. The wire 178 leading up to contact finger 131 connects with terminal 239. The wire 141' leading up to contact finger 133 connects with terminal 238. For this manual control the two semaphore arms are preferably timed for comparatively fast operation, which operation can be slowed to any extent desired by the manipulation of the switch. For example assume with the switch in the position shown, assume that the boulevard arm has moved to open position. The arm will remain stalled in this position as long as the officer desires traffic to pass in this direction, whereupon, by throwing the switch into its upper position, he can impress a potential on wire 178 and run the boulevard arm down. At the same time current is placed on wire 141' so that the cross street arm is run up immediately after. If the cross traffic warrants a longer time interval than the signal will give it, the officer pulls the switch 236 out to a neutral position after the cross-street arm has completed its movement into the "go" position and thus holds this cross-street arm up as long as desirable. By throwing the switch down on terminal 242 the cross-street arm can now be run down and the boulevard arm run up. From this point on the cycle is a repetition.

The small switch 251 in Fig. 18 enables the adjoining control wires 168 and 168' to be connected with the signal still in circuit, whereby that signal may be made to operate independently in accordance with the setting of its own time mechanisms without being under the control of any prior signal or exercising any control over any subsequent signal. Each of the signal units may be provided with such a switch 251.

In Fig. 19 I have shown the circuit connections of a signal unit wherein both semaphore arms operate in unison. The circuits are so arranged that each motor circuit is interrupted by its own timing mechanism, so that each semaphore arm will be sure to have moved into either a full "stop" or "go" position before its motor circuit is interrupted. Both motor circuits are closed by the timing mechanism corresponding to that semaphore arm which is open and which comes to the end of its timing. Some of the connections in this hook-up are the same as in the previous circuits, and accordingly, I shall only describe those connections which are different from the foregoing. Wire 146, instead of leading down from the switch 111 to the contact 132 extends down to the corresponding contact 132′ of the lower timing mechanism. A wire 253 leads down from upper contact finger 132 to terminal contact 115′ of the lower switch 111′. The wire 152, which, in the previous circuit diagrams had been extended to this switch terminal 115′ is extended down to the lower motor 63′, and has a branch 254 connecting with the contact finger 138′. Contact 133′ has a connection thru wire 255 with the feeder circuit wire 141′.

In the positions of the two timing mechanisms as shown, the upper semaphore arm is up and is just starting to move down and the lower semaphore arm is down and is just starting to move up. Current entering through wire 141′ is conducted through wire 255, contact finger 133′ and the lower contact drum to contact finger 132′ from whence it passes up through wire 146 to the upper switch 111. The stop finger 123 has at this time just dropped into the leading notch 256, and consequently the switch 111 is closed. Hence the circuit passes down through wire 147 to contact finger 137 where it passes up and down through the upper contact drum 83. The current flowing upwardly passes up through contact finger 138 and wires 167 and 163 to the upper motor 63, the other side of which is connected with wire 164 leading down to the common return. The current flowing in the other direction through contact drum 83 passes out through the contact finger 136 and down through wire 152 to the lower motor 63′, the other side of which is also connected to wire 164. Consequently both motors operate to run the upper arm down and the lower arm up. When the upper arm is fully down and the lower arm is fully up the switch 111 opens. Just prior to this the disc 89 has rotated around to present the trailing end of the notch 256 to the stop finger 123, and consequently when the switch 111 is opened the disc 89 is released. In the advancement of the disc 89 through the length of the slot 256 while both motors were running, the segment 144 was presented to the contact finger 132 so that a separate shunt circuit for the lower motor 63′ was substituted through switch 111′, wire 153′, contact fingers 137′ and 138′, and wires 254 and 152.

Consequently, if the lower motor required a slightly longer time interval to move its arm into proper position, it received current for this longer time interval through the circuit above traced. When the arm does reach its proper position the switch 111′ is opened in the same manner as the upper switch 111. The upper disc 89 only rotates a short distance when the stop finger 123 drops into the notch 257 and closes the switch 111. This leaves the segment 143 in engagement with its contact finger 133 and the segment 144 in engagement with its contact finger 132. At this time the lower disc 89′ is performing its timing function of measuring the time interval that the arm 24 is to be retained in up position. Consequently when the notch 258 revolves around and permits the switch 111′ to snap closed, current is conducted down through wire 253, switch 111′, wire 153′, contact drum 83′ and wires 254 and 152 to the lower motor 63′. Simultaneously, current is also impressed upon the contact finger 136′ through segment 157, so that the upper motor 63 is also operated. The upper motor 63 thereupon proceeds to run its semaphore arm to an up position and the lower motor runs its semaphore arm to a down position. The lower disc 89′ continues to rotate due to the length of the notch 258 and consequently a shunt path for the upper motor 63 through its switch 111 is substituted through contact fingers 133′—132′ and contact segments 183 and 184 for the previous circuit formerly extending through contact finger 136′. Subsequent to the making of the circuit through the contact fingers 133′ and 132′ the segment 157 rides out of contact with the finger 136′. Thereafter the circuit of each motor is controlled by its individual switch 111 or 111′. Hence, when the upper arm reaches a full up position its motor is automatically stopped and when the lower arm reaches a full down position its motor is automatically stopped. From this point on the cycle is a repetition of the foregoing.

I do not intend to be limited to the particular mechanisms disclosed nor to the particular circuit connections for producing the operations herein described, except as they are essential as distinctions over the prior art.

I claim:

1. In traffic-regulating mechanism, the combination of a movable traffic signal, electrically operated means for moving said signal, time-controlled contact mechanism for energizing said electrically operated means, said time-controlled contact mechanism being inert while said electrically operated means is operating, and means for starting said time-controlled contact mechanism into operation after said signal has moved into one indicating position.

2. In traffic-regulating mechanism, the combination of a first signal arm, a first electric motor for actuating the same, a second signal arm, a second electric motor for actuating the latter, switch mechanism for breaking the circuit of the first motor after said first signal has completed movement from one position to another, commutator mechanism controlling the circuit of said second motor, said commutator mechanism being controlled by said first motor, and time-controlled means cooperating with the switch mechanism for closing the latter and establishing a circuit for said second motor through said switch mechanism and the commutator mechanism.

3. A traffic control signalling system comprising a succession of signals spaced along a highway, each having a "stop" and a "go" indication, means at each signal for causing the alternate exhibition of said indications, said system also including controlling means for causing the operation of a signal from one indication to another through the operation of an adjacent signal in the succession to give the alternate indication and said controlling means also including timing mechanism for determining the time of exhibition of each indication whereby a vehicle may travel along the highway at a predetermined speed without encountering a "stop" signal.

In witness whereof, I hereunto subscribe my name this 1st day of September, 1922.

FRANK E. WOODFORD.